(12) United States Patent
Zheng

(10) Patent No.: US 9,525,625 B2
(45) Date of Patent: Dec. 20, 2016

(54) METHOD AND APPARATUS FOR GENERATING FORWARDING ENTRIES FOR DEVICES IN OPTICAL NETWORK

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 14/656,167

(22) Filed: Mar. 12, 2015

(65) Prior Publication Data
US 2015/0188812 A1 Jul. 2, 2015

Related U.S. Application Data

(63) Continuation of application No. PCT/CN2013/083411, filed on Sep. 12, 2013.

(30) Foreign Application Priority Data

Sep. 12, 2012 (CN) .......................... 2012 1 0336323

(51) Int. Cl.
*H04J 14/00* (2006.01)
*H04L 12/713* (2013.01)
(Continued)

(52) U.S. Cl.
CPC ......... *H04L 45/586* (2013.01); *H04L 41/0893* (2013.01); *H04Q 11/00* (2013.01);
(Continued)

(58) Field of Classification Search
CPC .... H04L 49/70; H04L 45/586; H04L 41/0893; H04Q 11/00; H04Q 11/0066; H04Q 11/0067; H04Q 2011/0073; H04Q 2011/0077; H04Q 2213/1301; H04B 10/27; H04J 3/1652
(Continued)

(56) References Cited

U.S. PATENT DOCUMENTS 6,532,088 B1 * 3/2003 Dantu ................. H04J 14/0227
370/223
7,283,746 B2 * 10/2007 Ikeda .................. H04L 12/4641
398/46

(Continued)

FOREIGN PATENT DOCUMENTS

CN 101309207 A 11/2008
CN 101499951 A * 8/2009

(Continued)

OTHER PUBLICATIONS

Enns et al., "Nework Configuration Protocol (NETCONF)," IETF Standards Track, pp. 1-113, The Internet Society, Reston, Virginia (Jun. 2011).

(Continued)

*Primary Examiner* — Hibret Woldekidan
(74) *Attorney, Agent, or Firm* — Leydig, Voit & Mayer, Ltd.

(57) ABSTRACT

Embodiments of the present invention provide a method and an apparatus for generating forwarding entries for devices in an optical network. The optical network includes a virtual access node AN, where the virtual AN includes a first access device, a second access device, and an access port management apparatus. The access port management apparatus acquires a virtual AN forwarding entry sent by an access management device; generates a first forwarding entry for a first device in the first access device and the second access device according to the virtual AN forwarding entry; and generates a second forwarding entry for a second device in the first access device and the second access device according to the virtual AN forwarding entry. The virtual AN may automatically generate forwarding entries for the first access device and second access device in the virtual AN according to the virtual AN forwarding entry.

34 Claims, 14 Drawing Sheets

(51) Int. Cl.
*H04Q 11/00* (2006.01)
*H04L 12/24* (2006.01)

(52) U.S. Cl.
CPC ..... *H04Q 11/0066* (2013.01); *H04Q 11/0067* (2013.01); *H04Q 2011/0073* (2013.01); *H04Q 2011/0077* (2013.01); *H04Q 2213/1301* (2013.01)

(58) Field of Classification Search
USPC .................................. 398/45, 46, 49, 50, 57
See application file for complete search history.

(56) References Cited

U.S. PATENT DOCUMENTS

| | | | | |
|---|---|---|---|---|
| 7,734,172 B2* | 6/2010 | Tse-Au | ............. | H04Q 11/0005 398/25 |
| 8,406,622 B2* | 3/2013 | Doverspike | ........ | H04Q 11/0062 398/34 |
| 8,571,408 B2* | 10/2013 | Armstrong | ............ | H04L 49/357 398/45 |
| 8,606,105 B2* | 12/2013 | Ong | ...................... | H04L 45/586 398/47 |
| 8,699,490 B2* | 4/2014 | Zheng | ................ | H04L 12/2856 370/352 |
| 8,737,416 B2* | 5/2014 | Kuo | ........................ | H04L 47/10 370/216 |
| 9,407,532 B2 | 8/2016 | Wang | ...................... | H04L 41/04 |
| 2004/0208570 A1* | 10/2004 | Reader | ................. | H04L 12/467 398/79 |
| 2004/0264505 A1* | 12/2004 | Miki | ................... | H04L 49/3009 370/469 |
| 2005/0198371 A1* | 9/2005 | Smith | ..................... | H04L 45/02 709/238 |
| 2009/0323694 A1* | 12/2009 | Miki | ................... | H04L 49/3009 370/392 |
| 2010/0002702 A1* | 1/2010 | Saito | ....................... | H04L 45/18 370/392 |
| 2010/0132031 A1* | 5/2010 | Zheng | ................ | H04L 63/0227 726/13 |
| 2011/0170545 A1* | 7/2011 | Zheng | ................ | H04L 12/2856 370/392 |
| 2011/0228773 A1* | 9/2011 | Dholakia | .............. | H04L 45/586 370/390 |
| 2011/0235645 A1* | 9/2011 | Sardar | ................ | H04L 67/1097 370/395.53 |
| 2011/0274009 A1 | 11/2011 | Cooper | | |
| 2011/0305242 A1* | 12/2011 | Miki | ................... | H04L 49/3009 370/392 |
| 2012/0008943 A1* | 1/2012 | Singla | ................. | H04J 14/0204 398/45 |
| 2012/0099861 A1* | 4/2012 | Zheng | .................... | H04L 45/68 398/45 |
| 2014/0082197 A1* | 3/2014 | Wang | ...................... | H04L 41/04 709/225 |
| 2016/0036601 A1* | 2/2016 | Kusano | ............... | H04L 12/6418 370/401 |

FOREIGN PATENT DOCUMENTS

| | | |
|---|---|---|
| EP | 1885139 A1 | 2/2008 |
| EP | 2001172 A2 | 12/2008 |
| EP | 2037632 A1 | 3/2009 |
| EP | 2209324 A1 | 7/2010 |
| EP | 2362626 A1 | 8/2011 |
| EP | 2377328 A1 | 10/2011 |
| EP | 2439891 A1 | 4/2012 |
| EP | 2456189 A1 | 5/2012 |
| WO | WO 2010082016 A1 | 7/2010 |

OTHER PUBLICATIONS

"Open Flow Switch Specification," Version 1.3.1 (Wire Protocol 0x04), pp. 1-128, Open Network Foundation, Palo Alto, California (2012).

"Virtual Home Gateway: How can Home Gateway virtualization be achieved?" Eurescom Study Report, Eurescom, Heidelberg, Germany (Sep. 2011).

* cited by examiner

METHOD AND APPARATUS FOR GENERATING FORWARDING ENTRIES FOR DEVICES IN OPTICAL NETWORK

CROSS-REFERENCE TO RELATED APPLICATIONS

This application is a continuation of International Patent Application No. PCT/CN2013/083411, filed Sep. 12, 2013, which claims priority to Chinese Patent Application No. 201210336323.9, filed Sep. 12, 2012, both of which are hereby incorporated by reference in their entireties.

TECHNICAL FIELD

The present invention relates to communications technologies, and in particular, to a method and an apparatus for generating forwarding entries for devices in an optical network.

BACKGROUND

Currently, an optical access network generally includes a customer premises equipment (CPE for short) and an optical line terminal (OLT for short), and further includes devices located between the CPE and the OLT, for example, an optical network terminal (ONT for short), an optical network unit (ONU for short), a multi-dwelling unit (multi-dwelling unit, MDU for short), and/or a digital subscriber line access multiplexer (DSLAM for short). All the foregoing devices may be referred to as access nodes. Generally, forwarding tables on the access nodes are respectively configured manually, which leads to complex operation, maintenance, and management. In the communications field, a fiber to the drop/distribution point (Fibre to Drop/Distribution Point, FTTDp for short) technology is being explored currently, where FTTDp represents a fiber to the home premises outer wall technology. In the FTTDp technology, numerous access nodes such as ONUs or MDUs need to be deployed in a network. For example, in some cases, a quantity of ONUs is the same as a quantity of residential gateways, resulting in a huge total quantity. Correspondingly, configuration work of forwarding entries on the access nodes is more complex.

SUMMARY

The present invention provides a method and an apparatus for generating forwarding entries for devices in an optical network, to solve a problem of complex configuration work of forwarding entries on access nodes.

According to a first aspect, a method for generating forwarding entries for devices in an optical network is provided, where the optical network includes a virtual access node (AN for short), where the virtual AN includes a first access device, a second access device, and an access port management apparatus, and the method includes:

acquiring, by the access port management apparatus, a virtual AN forwarding entry sent by an access management device, where the virtual AN forwarding entry includes an ingress port, identifiers of services that need to be processed by the virtual AN, and an egress port;

generating, by the access port management apparatus, a first forwarding entry for a first device in the first access device and the second access device according to the virtual AN forwarding entry, where the first forwarding entry includes an ingress port, an egress port, and an identifier of a service that needs to be processed by the first device; and generating, by the access port management apparatus, a second forwarding entry for a second device in the first access device and the second access device according to the virtual AN forwarding entry, where the second forwarding entry includes an ingress port and an egress port.

According to the method of the first aspect, in a first possible implementation manner, the generating, by the access port management apparatus, a first forwarding entry for a first device in the first access device and the second access device according to the virtual AN forwarding entry, includes:

generating, by the access port management apparatus, the first forwarding entry for the first device according to a situation of distribution, which is between the first access device and the second access device, of the services that need to be processed by the virtual AN, and according to the virtual AN forwarding entry.

According to the method of the first possible implementation manner of the first aspect, in a second possible implementation manner, when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device, and the second access device is the second device; and the generating the first forwarding entry includes:

when the ingress port in the virtual AN forwarding entry includes a first virtual line identifier (Line ID for short), querying, by the access port management apparatus, a correspondence between the first virtual Line ID and a first physical Line ID according to the acquired first virtual Line ID, and determining the first physical Line ID, where the first physical Line ID includes a first Line ID of the first access device and a first Line ID of the second access device; and generating the first forwarding entry, where the ingress port in the first forwarding entry includes the first Line ID of the first access device, the egress port in the first forwarding entry includes an upstream egress port of the first access device, and the first forwarding entry further includes identifiers of the first part of services; or the generating the first forwarding entry includes:

when the ingress port in the virtual AN forwarding entry includes a first physical Line ID, and the first physical Line ID includes a first Line ID of the first access device and a first Line ID of the second access device, determining, by the access port management apparatus, the first Line ID of the first access device according to the first physical Line ID; and generating the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

According to the method of the second possible implementation manner of the first aspect, in a third possible implementation manner, the ingress port in the second forwarding entry includes the first Line ID of the second access device, the egress port in the second forwarding entry includes an upstream egress port of the second access device, and the second forwarding entry further includes identifiers of the second part of services.

According to the method of the first possible implementation manner of the first aspect, in a fourth possible implementation manner, when the situation of distribution, which is between the first access device and the second access device, of the services that need to be processed by the virtual AN is that the first access device processes all services in the services that need to be processed by the virtual AN, the first access device is the first device, and the second access device is the second device; and the generating the first forwarding entry includes:

when the ingress port in the virtual AN forwarding entry includes a first virtual line identifier Line ID, querying, by the access port management apparatus, a correspondence between the first virtual Line ID and a first physical Line ID according to the acquired first virtual Line ID, and determining the first physical Line ID, where the first physical Line ID includes a first Line ID of the first access device and a first Line ID of the second access device; and generating the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN; or the generating the first forwarding entry includes:

when the ingress port in the virtual AN forwarding entry includes a first physical Line ID, and the first physical Line ID includes a first Line ID of the first access device and a first Line ID of the second access device, determining, by the access port management apparatus, the first Line ID of the first access device according to the first physical Line ID; and generating the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

According to the method of the fourth possible implementation manner of the first aspect, in a fifth possible implementation manner, the ingress port in the second forwarding entry includes the first Line ID of the second access device, and the egress port in the second forwarding entry includes an upstream egress port of the second access device.

According to the method of the first possible implementation manner of the first aspect, in a sixth possible implementation manner, when the situation of distribution, which is between the first access device and the second access device, of the services that need to be processed by the virtual AN is that the second access device processes all services in the services that need to be processed by the virtual AN, the second access device is the first device, and the first access device is the second device; and the generating the first forwarding entry includes:

when the ingress port in the virtual AN forwarding entry includes a first virtual Line ID, querying, by the access port management apparatus, a correspondence between the first virtual Line ID and a first physical Line ID according to the acquired first virtual Line ID, and determining the first physical Line ID, where the first physical Line ID includes a first Line ID of the first access device and a first Line ID of the second access device; and generating the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN; or the generating the first forwarding entry includes:

when the ingress port in the virtual AN forwarding entry includes a first physical Line ID, and the first physical Line ID includes a first Line ID of the first access device and a first Line ID of the second access device, determining, by the access port management apparatus, the first Line ID of the second access device according to the first physical Line ID; and generating the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

According to the method of the sixth possible implementation manner of the first aspect, in a seventh possible implementation manner, the ingress port in the second forwarding entry includes the first Line ID of the first access device, and the egress port in the second forwarding entry includes an upstream egress port of the first access device.

According to the method of any one of the first possible implementation manner to the seventh possible implementation manner of the first aspect, in an eighth possible implementation manner, the services are virtual local area network (VLAN for short) services.

According to the method of the first aspect, in a ninth possible implementation manner, the first access device is the first device, and the second access device is the second device;

the acquiring, by the access port management apparatus, a virtual AN forwarding entry sent by an access management device, includes:

acquiring, by the access port management apparatus, a virtual AN upstream forwarding entry and a virtual AN downstream forwarding entry that are sent by the access management device, where the virtual AN upstream forwarding entry includes an upstream ingress port, an identifier of an external pseudo wire (PW for short) of the virtual AN, an upstream label of the external PW of the virtual AN, and an upstream egress port, and the virtual AN downstream forwarding entry includes a downstream ingress port, the identifier of the external PW of the virtual AN, a downstream label of the external PW of the virtual AN, and a downstream egress port; and the generating, by the access port management apparatus, a first forwarding entry for a first device in the first access device and the second access device according to the virtual AN forwarding entry, includes:

after the access port management apparatus determines that the first access device is a switching provider edge (SPE for short) device between an internal PW of the virtual AN and the external PW of the virtual AN, generating an upstream PW forwarding entry of the first access device according to the virtual AN upstream forwarding entry, where the upstream PW forwarding entry of the first access device includes an ingress port, an upstream label of the internal PW of the virtual AN, the upstream label of the external PW of the virtual AN, and an egress port, the ingress port in the upstream PW forwarding entry of the first access device includes a first Line ID of the first access device, the egress port in the upstream PW forwarding entry of the first access device is the upstream egress port in the virtual AN upstream forwarding entry, and the upstream PW forwarding entry of the first access device is a PW switching entry.

According to the method of the ninth possible implementation manner of the first aspect, in a tenth possible implementation manner, the second forwarding entry is an upstream PW forwarding entry of the second access device, where an ingress port in the upstream PW forwarding entry of the second access device includes a Line ID of the second access device, an egress port in the upstream PW forwarding entry of the second access device includes an upstream egress port of the second access device, and the upstream PW forwarding entry of the second access device further includes the upstream label of the internal PW of the virtual AN.

According to the method of the ninth possible implementation manner or the tenth possible implementation manner of the first aspect, in an eleventh possible implementation manner, the generating, by the access port management apparatus, a first forwarding entry for a first device in the first access device and the second access device according to the virtual AN forwarding entry, further includes:

after the access port management apparatus determines that the first access device is the SPE device between the internal PW of the virtual AN and the external PW of the virtual AN, generating a downstream PW forwarding entry of the first access device according to the virtual AN downstream forwarding entry, where the downstream PW forwarding entry of the first access device includes an ingress port, the downstream label of the external PW of the virtual AN, a downstream label of the internal PW of the virtual AN, and an egress port, and the downstream PW forwarding entry of the first access device is a PW switching entry.

According to the method of the eleventh possible implementation manner of the first aspect, in a twelfth possible implementation manner, the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

According to the method of any one implementation manner from the ninth possible implementation manner to the twelfth possible implementation manner of the first aspect, in a thirteenth possible implementation manner, further includes:

when the ingress port in the virtual AN forwarding entry includes a first virtual Line ID, querying, by the access port management apparatus, a correspondence between the first virtual Line ID and a first physical Line ID according to the acquired first virtual Line ID, and determining the Line ID of the first access device and the Line ID of the second access device, where the first physical Line ID includes the Line ID of the first access device and the Line ID of the second access device; or when the ingress port in the virtual AN forwarding entry includes a first physical Line ID, determining, by the access port management apparatus, the first Line ID of the first access device and the Line ID of the second access device according to the first physical Line ID, where the first physical Line ID includes the first Line ID of the first access device and the Line ID of the second access device.

According to the method of any one implementation manner from the second possible implementation manner to the thirteenth possible implementation manner of the first aspect, in a fourteenth possible implementation manner, the virtual Line ID includes a device identifier of the virtual AN and a first port number of the virtual AN;

the first Line ID of the first access device includes a device identifier of the first access device and a first port number of the first access device; and the first Line ID of the second access device includes a device identifier of the second access device and a first port number of the second access device.

According to the method of the first aspect or any one of the first possible implementation manner to the fourteenth possible implementation manner of the first aspect, in a fifteenth possible implementation manner, the first access device is an optical line terminal (OLT for short), and the second access device is a first optical network unit (ONU for short), a first optical network terminal (ONT for short), a first multi-dwelling unit (MDU for short), or a first digital subscriber line access multiplexer (DSLAM for short); or the first access device is a first DSLAM, and the second access device is a second DSLAM; or the first access device is a DSLAM management device, and the second access device is a DSLAM.

According to the method of the first aspect or any one of the first possible implementation manner to the fifteenth possible implementation manner of the first aspect, in a sixteenth possible implementation manner, the virtual AN forwarding entry received by the access port management apparatus is sent by the access management device by using a first control protocol or a first management protocol based on layer 3 of an open systems interconnection (OSI for short) model; and when the access port management apparatus needs to send the first forwarding entry or the second forwarding entry to the second access device, the access port management apparatus sends the first forwarding entry or second forwarding entry by using a second control protocol or a second management protocol based on layer 2 of the OSI model.

According to a second aspect, an access port management apparatus is provided and applied to a virtual access node AN that includes a first access device and a second access device, where the access port management apparatus includes:

an acquiring unit, configured to acquire a virtual AN forwarding entry sent by an access management device, where the virtual AN forwarding entry includes an ingress port, identifiers of services that need to be processed by the virtual AN, and an egress port;

a first generating unit, configured to generate a first forwarding entry for a first device in the first access device and the second access device according to the virtual AN forwarding entry, where the first forwarding entry includes an ingress port, an egress port, and an identifier of a service that needs to be processed by the first device; and a second generating unit, configured to generate a second forwarding entry for a second device in the first access device and the second access device according to the virtual AN forwarding entry, where the second forwarding entry includes an ingress port and an egress port.

According to the apparatus of the second aspect, in a first possible implementation manner, the first generating unit is specifically configured to:

generate the first forwarding entry for the first device according to a situation of distribution, which is between the first access device and the second access device, of the services that need to be processed by the virtual AN, and according to the virtual AN forwarding entry.

According to the apparatus of the first possible implementation manner of the second aspect, in a second possible implementation manner, when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device, and the second access device is the second device; and the first generating unit includes:

a first determining subunit, configured to: when the ingress port in the virtual AN forwarding entry includes a first virtual line identifier Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and a first generating subunit, configured to generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services; or the first generating unit includes:

a second determining subunit, configured to: when the ingress port in the virtual AN forwarding entry includes a first physical Line ID, and the first physical Line ID includes a first Line ID of the first access device and a first Line ID of the second access device, determine the first Line ID of the first access device according to the first physical Line ID; and a second generating subunit, configured to generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

According to the apparatus of the second possible implementation manner of the second aspect, in a third possible implementation manner, the ingress port in the second forwarding entry includes the first Line ID of the second access device, the egress port in the second forwarding entry includes an upstream egress port of the second access device, and the second forwarding entry further includes identifiers of the second part of services.

According to the apparatus of the first possible implementation manner of the second aspect, in a fourth possible implementation manner, when the situation of distribution, which is between the first access device and the second access device, of the services that need to be processed by the virtual AN is that the first access device processes all services in the services that need to be processed by the virtual AN, the first access device is the first device, and the second access device is the second device; and the first generating unit includes:

a third determining subunit, configured to: when the ingress port in the virtual AN forwarding entry includes a first virtual Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and a third generating subunit, configured to generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN; or the first generating unit includes:

a fourth determining subunit, configured to: when the ingress port in the virtual AN forwarding entry includes a first physical Line ID, and the first physical Line ID includes a first Line ID of the first access device and a first Line ID of the second access device, determine the first Line ID of the first access device according to the first physical Line ID; and a fourth generating subunit, configured to generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

According to the apparatus of the fourth possible implementation manner of the second aspect, in a fifth possible implementation manner, the ingress port in the second forwarding entry includes the first Line ID of the second access device, and the egress port in the second forwarding entry includes an upstream egress port of the second access device.

According to the apparatus of the first possible implementation manner of the second aspect, in a sixth possible implementation manner, when the situation of distribution, which is between the first access device and the second access device, of the services that need to be processed by the virtual AN is that the second access device processes all services in the services that need to be processed by the virtual AN, the second access device is the first device, and the first access device is the second device; and the first generating unit includes:

a fifth determining subunit, configured to: when the ingress port in the virtual AN forwarding entry includes a first virtual Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and a fifth generating subunit, configured to generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN; or the first generating unit includes:

a sixth determining subunit, configured to: when the ingress port in the virtual AN forwarding entry includes a first physical Line ID, and the first physical Line ID includes a first Line ID of the first access device and a first Line ID of the second access device, determine the first Line ID of the second access device according to the first physical Line ID; and a sixth generating subunit, configured to generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

According to the apparatus of the sixth possible implementation manner of the second aspect, in a seventh possible implementation manner, the ingress port in the second forwarding entry includes the first Line ID of the first access device, and the egress port in the second forwarding entry includes an upstream egress port of the first access device.

According to the apparatus of any one of the first possible implementation manner to the seventh possible implementation manner of the second aspect, in an eighth possible implementation manner, the services are VLAN.

According to the apparatus of the second aspect, in a ninth possible implementation manner, the first access device is the first device, and the second access device is the second device; and the acquiring unit is specifically configured to:

acquire a virtual AN upstream forwarding entry and a virtual AN downstream forwarding entry that are sent by the access management device, where the virtual AN upstream forwarding entry includes an upstream ingress port, an identifier of an external PW of the virtual AN, an upstream label of the external PW of the virtual AN, and an upstream egress port, and the virtual AN downstream forwarding entry includes a downstream ingress port, the identifier of the external PW of the virtual AN, a downstream label of the external PW of the virtual AN, and a downstream egress port; and the first generating unit is specifically configured to:

after the access port management apparatus determines that the first access device is an SPE device between an internal PW of the virtual AN and the external PW of the virtual AN, generate an upstream PW forwarding entry of the first access device according to the virtual AN upstream forwarding entry, where the upstream PW forwarding entry of the first access device includes an ingress port, an upstream label of the internal PW of the virtual AN, the upstream label of the external PW of the virtual AN, and an egress port, the ingress port in the upstream PW forwarding entry of the first access device includes a first Line ID of the first access device, the egress port in the upstream PW forwarding entry of the first access device is the upstream egress port in the virtual AN upstream forwarding entry, and the upstream PW forwarding entry of the first access device is a PW switching entry.

According to the apparatus of the ninth possible implementation manner of the second aspect, in a tenth possible implementation manner, the second forwarding entry is an upstream PW forwarding entry of the second access device, where an ingress port in the upstream PW forwarding entry of the second access device includes a Line ID of the second access device, an egress port in the upstream PW forwarding entry of the second access device includes an upstream egress port of the second access device, and the upstream PW forwarding entry of the second access device further includes the upstream label of the internal PW of the virtual AN.

According to the apparatus of the ninth possible implementation manner or the tenth possible implementation manner of the second aspect, in an eleventh possible implementation manner, the first generating unit is further specifically configured to:

after the access port management apparatus determines that the first access device is the SPE device between the internal PW of the virtual AN and the external PW of the virtual AN, generate a downstream PW forwarding entry of the first access device according to the virtual AN downstream forwarding entry, where the downstream PW forwarding entry of the first access device includes an ingress port, the downstream label of the external PW of the virtual AN, a downstream label of the internal PW of the virtual AN, and an egress port, and the downstream PW forwarding entry of the first access device is a PW switching entry.

According to the apparatus of the eleventh possible implementation manner of the second aspect, in a twelfth possible implementation manner, the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

According to the apparatus of any one implementation manner from the ninth possible implementation manner to the twelfth possible implementation manner of the second aspect, in a thirteenth possible implementation manner, the apparatus includes a line identifier Line ID determining unit, where:

the Line ID determining unit is configured to:

when the ingress port in the virtual AN forwarding entry includes a first virtual line identifier Line ID, query a correspondence between the first virtual Line ID and a first physical Line ID according to the acquired first virtual Line ID, and determine the first Line ID of the first access device and the Line ID of the second access device, where the first physical Line ID includes the first Line ID of the first access device and the Line ID of the second access device; or the Line ID determining unit is configured to:

when the ingress port in the virtual AN forwarding entry includes a first physical line identifier Line ID, determine the first Line ID of the first access device and the Line ID of the second access device according to the first physical Line ID, where the first physical Line ID includes the first Line ID of the first access device and the Line ID of the second access device.

According to the method of any one implementation manner from the second possible implementation manner to the thirteenth possible implementation manner of the second aspect, in a fourteenth possible implementation manner, the virtual Line ID includes a device identifier of the virtual AN and a first port number of the virtual AN;

the first Line ID of the first access device includes a device identifier of the first access device and a first port number of the first access device; and the first Line ID of the second access device includes a device identifier of the second access device and a first port number of the second access device.

According to the apparatus of the second aspect or any one of the first possible implementation manner to the fourteenth possible implementation manner of the second aspect, in a fifteenth possible implementation manner, the first access device is an OLT, and the second access device is a first ONU, a first ONT, a first multi-dwelling unit MDU, or a first DSLAM; or the first access device is a first DSLAM, and the second access device is a second DSLAM; or the first access device is a DSLAM management device, and the second access device is a DSLAM.

According to the apparatus of the second aspect or any one of the first possible implementation manner to the fifteenth possible implementation manner of the second aspect, in a sixteenth possible implementation manner, the virtual AN forwarding entry received by the access port management apparatus is sent by the access management device by using a first control protocol or a first management protocol based on layer 3 of an OSI model; and when the access port management apparatus needs to send the first forwarding entry or the second forwarding entry to the second access device, the access port management apparatus sends the first forwarding entry or the second forwarding entry by using a second control protocol or a second management protocol based on layer 2 of the OSI model.

As may be known from the foregoing content, a virtual AN may automatically generate forwarding entries for a first access device and a second access device in the virtual AN according to a virtual AN forwarding entry, so that the virtual AN can process services or a part of services that are related to the virtual AN forwarding entry. Therefore, it is unnecessary to manually configure forwarding entries for the first access device and second access device in the virtual AN respectively, and efficiency is improved greatly.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
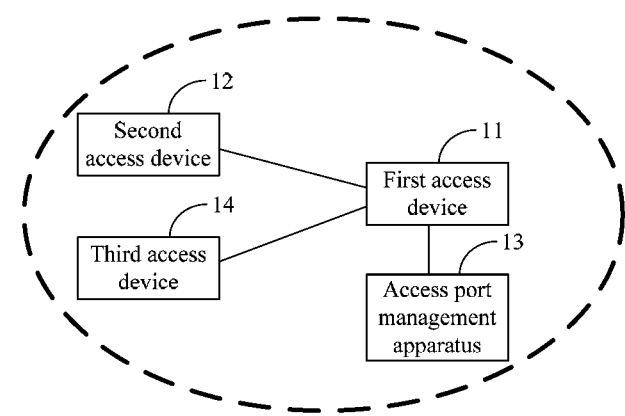
FIG. 1 shows a schematic diagram of a virtual access node according to an embodiment of the present invention.
Figure 2:
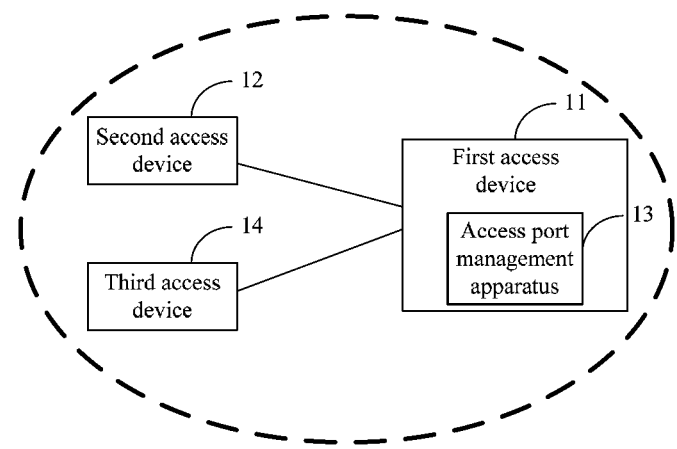
FIG. 2 shows a schematic diagram of a virtual access node according to an embodiment of the present invention.

An embodiment of the present invention discloses a method for generating forwarding entries for devices in an optical network. The optical network includes a virtual access node (Access Node, AN for short) 10. As shown in FIG. 1 or FIG. 2, the virtual AN includes a first access device 11, a second access device 12, and an access port management apparatus 13. Optionally, the first access device 11 and the second access device 12 may be in a series connection as shown in FIG. 1 or FIG. 2, and may also be in a parallel connection. Optionally, as shown in FIG. 2, the access port management apparatus 13 is located in the first access device 11. That the access port management apparatus 13 is located in the first access device 11 may be understood to be that the access port management apparatus 13 is located in a housing of the first access device 11 or on a surface of the housing or installed in the housing. Optionally, as shown in FIG. 1, the access port management apparatus 13 is located outside the first access device 11, and a communication connection is established between the access port management apparatus 13 and the first access device 11. In addition, the virtual AN may further include a third access device 14. Both the third access device 14 and the second access device 12 are downstream devices of the first access device 11. The virtual AN may further include multiple access devices connected to the second access device 12 and third access device 14. Definitely, the virtual AN may also not include the third access device 14 and other similar access devices.

Figure 3:
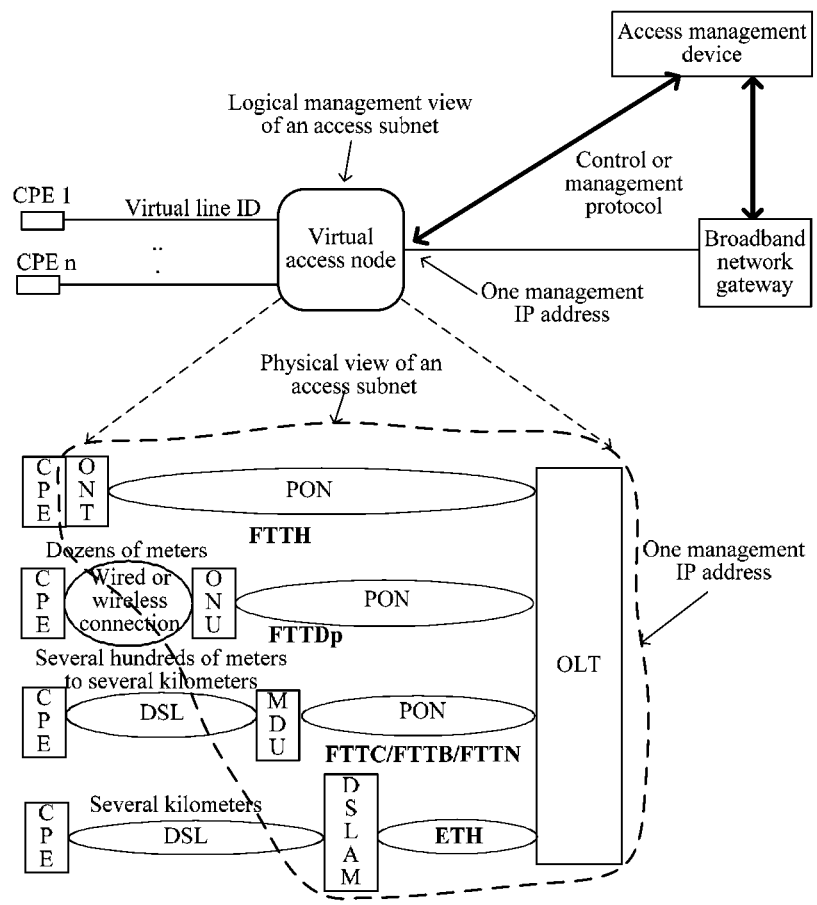
FIG. 3 shows a specific schematic diagram of a network including the virtual AN shown in FIG. 1 or FIG. 2 according to an embodiment of the present invention.

FIG. 3 shows a specific schematic diagram of a network including the virtual AN shown in FIG. 1 or FIG. 2.

In FIG. 3, the virtual AN is logically considered as a device, and uses one management IP address. The virtual AN can perform communication with an access management device outside the virtual AN by using a first control protocol or a first management protocol based on layer 3 of an open systems interconnection (OSI) model, and receive a virtual AN forwarding entry that is sent by the access management device for the virtual AN. An ingress port in the virtual AN forwarding entry is a virtual line identifier (Line ID), that is, an identifier of an ingress port that is of the virtual AN and is corresponding to the virtual AN forwarding entry is the virtual Line ID. As shown in FIG. 3, the virtual AN is connected to a broadband network gateway (BNG for short) on a network side, and is also connected to multiple customer premises equipments (CPEs for short) located on a user side, for example, a CPE 1 and a CPE n shown in FIG. 3. In this embodiment, a Line ID is used to identify a port. However, because port numbers in different devices may be the same, a port number cannot be used alone to identify a port. Therefore, a Line ID includes at least a device ID of a device in which a port identified by the Line ID is located and a port number of the port identified by the Line ID.

The virtual AN shown in FIG. 3 includes an OLT, and further includes an ONT, an ONU, an MDU, and a DSLAM, where the OLT is connected to the ONT, ONU, MDU, and DSLAM in a point-to-multipoint manner, and the ONT, ONU, MDU, and DSLAM are the "multiple points". The ONT is connected to the OLT through a passive optical network (PON for short) by using a fiber to the home (FTTH for short) technology. A physical distance between the ONT and a CPE connected to the ONT is very short. The ONU is connected to the OLT through a PON by using a fiber to the drop/distribution point (Fibre to Drop/Distribution Point, FTTDp for short) technology. The ONU and a CPE connected to the ONU are connected in a wired or wireless manner, and a physical distance between them is dozens of meters. The MDU is connected to the OLT through a PON by using an FTTC or fiber to the building (Fibre To The Building, FTTB for short) or fiber to the node (Fibre To The Node, FTTN for short) technology. The MDU and a CPE connected to the MDU are connected by using a digital subscriber line (DSL for short) technology, and a physical distance between them is several hundreds of meters to several kilometers. The DSLAM and a CPE connected to the DSLAM are connected by using a DSL technology, and a physical distance between them is several kilometers.

The virtual Line ID includes a device identifier of the virtual AN and a port number of the virtual AN. In addition, the virtual Line ID may further include one or more of a chassis (chassis) number, a rack (rack) number, a frame (frame) number, a slot (slot) number, and a sub-slot (sub-slot) number of the virtual AN.

Figure 4A:
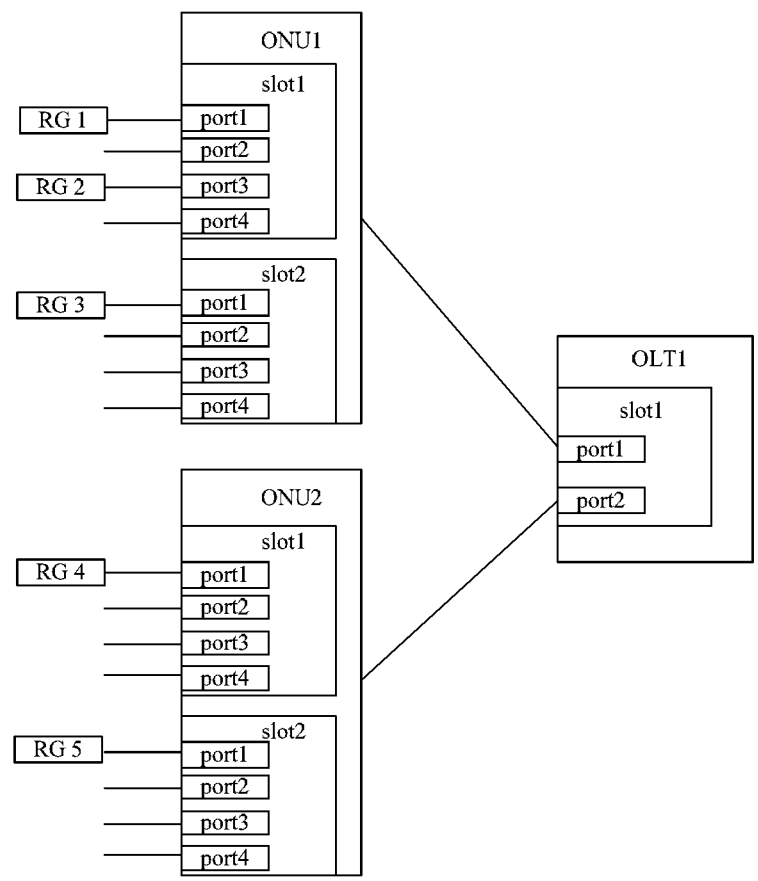
FIG. 4A shows a schematic diagram of a physical access subnet according to an embodiment of the present invention.

FIG. 4A shows a schematic diagram of a physical access subnet including an ONU1, an ONU2, and an OLT1. The ONU1 and ONU2 are respectively connected to the OLT1. The ONU1 includes a slot1 and a slot2. The ONU2 also includes a slot1 and a slot2. Each slot in the four slots includes a port1, a port2, a port3, and a port4. A residential gateway (Residential Gateway, RG for short) 1 to a residential gateway 5 are respectively connected to corresponding ports. When the physical access subnet shown in FIG. 4A needs to be virtualized into one virtual AN, a logical schematic diagram of the obtained virtual AN is FIG. 4B.

Figure 4B:
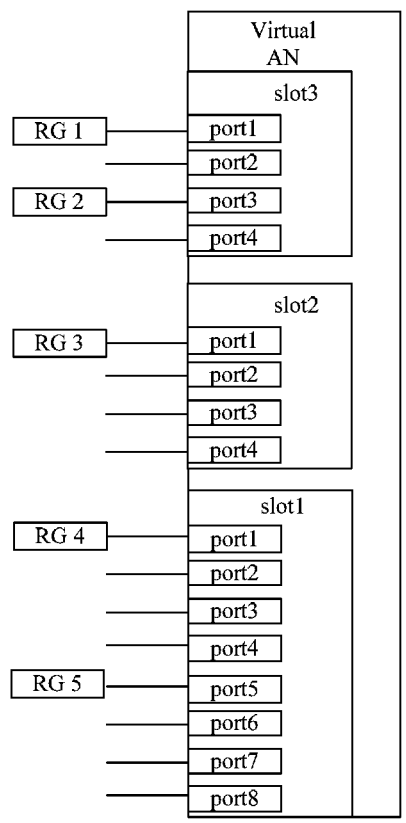
FIG. 4B shows a logical schematic diagram of a virtual AN according to an embodiment of the present invention.

As shown in FIG. 4B, the ONU1, ONU2, and OLT1 are virtualized into one virtual AN. The slot1 and slot2 in the ONU2 are jointly virtualized into a slot1 in the virtual AN. The ports 1-4 in the slot1 in the ONU2 are virtualized into ports 1-4 in the slot1 in the virtual AN. The ports 1-4 in the slot2 in the ONU2 are virtualized into ports 5-8 in the slot1 in the virtual AN. The slot2 in the ONU1 is virtualized into a slot2 in the virtual AN. The ports 1-4 in the slot2 in the ONU1 are virtualized into ports 1-4 in the slot2 in the virtual AN. The slot1 in the ONU1 is virtualized into a slot3 in the virtual AN. The ports 1-4 in the slot1 in the ONU1 are virtualized into ports 1-4 in the slot3 in the virtual AN.

In FIG. 4A, a Line ID of the port1 in the slot1 in the ONU1 is ONU1/slot1/port1, and a Line ID of the port1 in the slot1 in the OLT1 is OLT1/slot1/port1. In FIG. 4B, the port1 in the slot3 in the virtual AN is obtained by virtualization according to the port1 in the slot1 in the ONU1 and the port1 in the slot1 in the OLT1. Therefore, it may be known that a virtual Line ID in the virtual AN should be corresponding to a physical Line ID, where the physical Line ID includes a Line ID of the ONU and a Line ID of the OLT. Because both the ONU and the OLT are physical devices, both the Line ID of the ONU and the Line ID of the OLT are physical Line IDs.

When the ONU1, ONU2, and OLT1 shown in FIG. 4A are virtualized into the virtual AN shown in FIG. 4B, a correspondence between virtual Line IDs of the virtual AN and physical Line IDs corresponding to the virtual Line IDs is shown in Table 1. Line IDs of ONUs in Table 1 are planned in a unified manner, and no Line IDs of the ONUs are the same.

TABLE 1

| Physical Line ID | | |
|---|---|---|
| Line ID of ONU | Line ID of OLT | Virtual Line ID |
| ONU2 ID/slot1/port1 | OLT1 ID/slot1/port2 | Virtual AN ID/slot1/port1 |
| ... | ... | ... |
| ONU2 ID/slot1/port4 | OLT1 ID/slot1/port2 | Virtual AN ID/slot1/port4 |
| ONU2 ID/slot2/port1 | OLT1 ID/slot1/port2 | Virtual AN ID/slot1/port5 |
| ... | | ... |
| ONU2 ID/slot2/port4 | OLT1 ID/slot1/port2 | Virtual AN ID/slot1/port8 |
| ONU1 ID/slot2/port1 | OLT1 ID/slot1/port1 | Virtual AN ID/slot2/port1 |
| ... | | ... |
| ONU1 ID/slot2/port4 | OLT1 ID/slot1/port1 | Virtual AN ID/slot2/port4 |
| ONU1 ID/slot1/port1 | OLT1 ID/slot1/port1 | Virtual AN ID/slot3/port1 |
| ... | | ... |
| ONU1 ID/slot1/port4 | OLT1 ID/slot1/port1 | Virtual AN ID/slot3/port4 |

Figure 5:
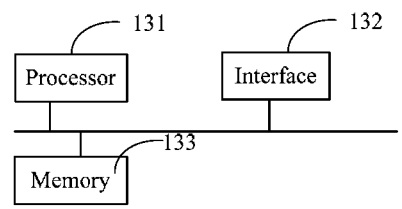
FIG. 5 shows a schematic diagram of an access port management apparatus according to an embodiment of the present invention.

As shown in FIG. 5, the access port management apparatus 13 includes a processor 131, an interface 132, and a memory 133. The processor 131, interface 132, and memory 133 cooperate with each other and work in a coordinated manner, so that operations of the access port management apparatus 13 are implemented.

Figure 6:
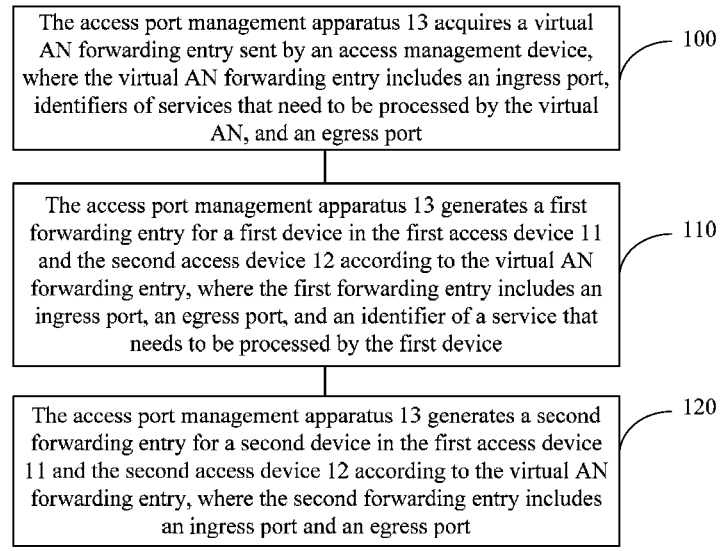
FIG. 6 shows a schematic diagram of a method for generating forwarding entries according to an embodiment of the present invention.

As shown in FIG. 6, a method for generating forwarding entries according to an embodiment of the present invention includes the following content:

100. The access port management apparatus 13 acquires a virtual AN forwarding entry sent by an access management device, where the virtual AN forwarding entry includes an ingress port, identifiers of services that need to be processed by the virtual AN, and an egress port.

Optionally, the virtual AN forwarding entry is sent by the access management device by using a first control protocol or a first management protocol based on layer 3 of OSI, for example, an Internet Protocol (IP for short) layer. A destination IP address of a packet carrying the virtual AN forwarding entry is a management IP address of the virtual AN. The first control protocol may be the OpenFlow (Openflow) protocol or access node control protocol (ANCP for short). The first management protocol may be the network configuration (Netconf) protocol or simple network management protocol (SNMP for short).

Optionally, the ingress port in the virtual AN forwarding entry may include a first virtual line identifier (Line ID), and may also include a first physical Line ID, where the first physical Line ID includes a first Line ID of a first device and a first Line ID of a second device. The first virtual Line ID includes a device identifier of the virtual AN and a first port number of the virtual AN. Optionally, the virtual Line ID may further include one or more of a chassis (chassis) number, a rack (rack) number, a frame (frame) number, a slot (slot) number, and a sub-slot (sub-slot) number of the virtual AN. Information included in the first Line ID of the first device and the first Line ID of the second device is similar to information included in the virtual Line ID. A first Line ID of the first access device includes a device identifier of the first access device and a first port number of the first access device. A first Line ID of the second access device includes a device identifier of the second access device and a first port number of the second access device. In addition, the first Line ID of the first access device may further include one or more of a chassis number, a rack number, a frame number, a slot number, and a sub-slot number of the first access device, and the first Line ID of the second access device may further include one or more of a chassis number, a rack number, a frame number, a slot number, and a sub-slot number of the second access device.

When the ingress port in the virtual AN forwarding entry includes a virtual Line ID, the access port management apparatus can acquire or has acquired in advance a correspondence between the virtual Line ID and a physical Line ID corresponding to the virtual Line ID.

In this embodiment, the virtual AN may use one management IP address. A management device in a network considers all devices included in the virtual AN as a whole, that is, as one device, so that a network structure becomes simple.

The services that need to be processed by the virtual AN are virtual local area network (VLAN for short) or pseudo wire (PW for short) and may also be other types of services.

When the services that need to be processed by the virtual AN are VLAN, the identifiers of the services that need to be processed by the virtual AN in the virtual AN forwarding entry include VLAN IDs.

When the services that need to be processed by the virtual AN are PW, the virtual AN forwarding entry includes a virtual AN upstream forwarding entry and a virtual AN downstream forwarding entry. The virtual AN upstream forwarding entry includes an upstream ingress port, an identifier of an external PW of the virtual AN, an upstream label of the external PW of the virtual AN, and an upstream egress port, and the virtual AN downstream forwarding entry includes a downstream ingress port, the identifier of the external PW of the virtual AN, a downstream label of the external PW of the virtual AN, and a downstream egress port. The identifier of the external PW of the virtual AN, the upstream label of the external PW of the virtual AN, and the downstream label of the external PW of the virtual AN all belong to the identifiers of the services that need to be processed by the virtual AN.

The egress port in the virtual AN forwarding entry is an upstream egress port of the first access device 11.

Optionally, in this embodiment, the access port management apparatus 13 may further acquire a virtual AN forwarding entry in multiple other manners, for example, receive a virtual AN forwarding entry sent by another device other than an access management device 14 in the network, or receive a virtual AN forwarding entry directly configured by an administrator. The virtual AN forwarding entry may be automatically generated by a device in the network according to a structure of the virtual AN and the services that need to be processed, and may also be generated by a network administrator according to the structure of the virtual AN and the services that need to be processed. A main problem to be solved by this embodiment includes how to process a virtual AN forwarding entry that is already generated.

110. The access port management apparatus 13 generates a first forwarding entry for a first device in the first access device 11 and the second access device 12 according to the virtual AN forwarding entry, where the first forwarding entry includes an ingress port, an egress port, and an identifier of a service that needs to be processed by the first device.

The identifier of the service that needs to be processed by the first device is used to indicate that the first device needs to encapsulate a first data flow, which is received from the ingress port in the first forwarding entry, into the service corresponding to the identifier of the service that needs to be processed by the first device. For example, when the identifier of the service that needs to be processed by the first device is an identifier of a VLAN1, the first device needs to encapsulate the first data flow into the VLAN1. In this way, distribution of the services that need to be processed by the AN is implemented in the AN. Optionally, when multiple VLAN identifiers are included in identifiers of services that need to be processed by the first device, the first device needs to use the multiple VLAN identifiers to perform VLAN encapsulation on the first data flow for multiple times according to a sequence.

The first access device 11 and the second access device 12 may be respectively different specific devices. For example, the first access device 11 is an optical line terminal (OLT for short), and the second access device 12 is a first optical network unit (ONU for short), a first optical network terminal (ONT for short), a first multi-dwelling unit (MDU for short), or a first subscriber line access multiplexer (DSLAM for short); or the first access device 11 is a first digital subscriber line access multiplexer (DSLAM for short), and the second access device 12 is a second DSLAM; or the first access device is a digital subscriber line access multiplexer (DSLAM for short) management device, and the second access device is a first DSLAM.

Optionally, that the access port management apparatus 13 generates a first forwarding entry for a first device in the first access device 11 and the second access device 12 according to the virtual AN forwarding entry includes that:

the access port management apparatus 13 generates the first forwarding entry for the first device in the first access device 11 and the second access device 12 according to a situation of distribution, which is between the first access device and the second access device, of the services that need to be processed by the virtual AN, and according to the virtual AN forwarding entry.

Situations of distribution, which is between the first device and the second device, of the services that need to be processed by the virtual AN may include multiple situations. For example, the first access device may process a first part of services in the services that need to be processed by the virtual AN, and the second access device processes a second part of services in the services that need to be processed by the virtual AN; or the first access device may process all the services that need to be processed by the virtual AN; or the second access device may process all the services that need to be processed by the virtual AN.

For different situations of distribution, corresponding methods for generating the first forwarding entry are provided respectively.

Situation 1

Figure 7A:
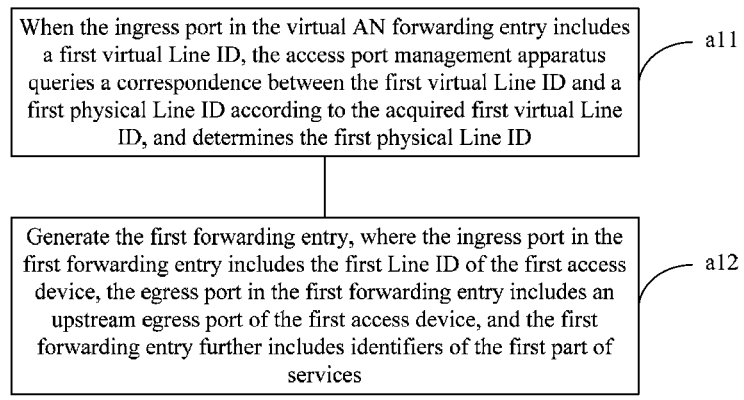
FIG. 7A shows a schematic diagram of a method for generating a first forwarding entry according to an embodiment of the present invention.

When the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device. As shown in FIG. 7A, the method for generating the first forwarding entry includes the following content:

a11. When the ingress port in the virtual AN forwarding entry includes a first virtual line identifier (Line ID), the access port management apparatus queries a correspondence between the first virtual Line ID and a first physical Line ID according to the acquired first virtual Line ID, and determines the first physical Line ID, where the first physical Line ID includes a first Line ID of the first access device and a first Line ID of the second access device.

a12. Generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

Figure 7B:
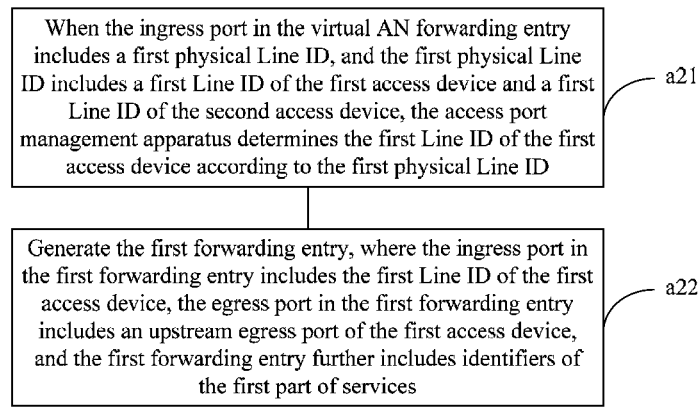
FIG. 7B shows a schematic diagram of a method for generating a first forwarding entry according to an embodiment of the present invention.

As shown in FIG. 7B, optionally, in the situation 1, a method including the following content may also be used to generate the first forwarding entry:

a21. When the ingress port in the virtual AN forwarding entry includes a first physical line identifier (Line ID), and the first physical Line ID includes a first Line ID of the first access device and a first Line ID of the second access device, the access port management apparatus determines the first Line ID of the first access device according to the first physical Line ID.

a22. Generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

Situation 2

Figure 7C:
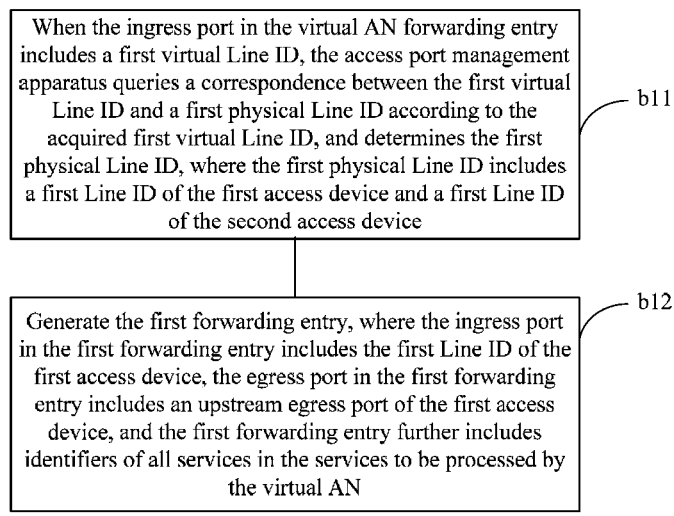
FIG. 7C shows a schematic diagram of a method for generating a first forwarding entry according to an embodiment of the present invention.

When the situation of distribution, which is between the first access device and the second access device, of the services that need to be processed by the virtual AN is that the first access device processes all the services in the services that need to be processed by the virtual AN, the first access device is the first device. As shown in FIG. 7C, the method for generating the first forwarding entry includes the following content:

b11. When the ingress port in the virtual AN forwarding entry includes a first virtual line identifier (Line ID), the access port management apparatus queries a correspondence between the first virtual Line ID and a first physical Line ID according to the acquired first virtual Line ID, and determines the first physical Line ID, where the first physical Line ID includes a first Line ID of the first access device and a first Line ID of the second access device.

b12. Generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

Figure 7D:
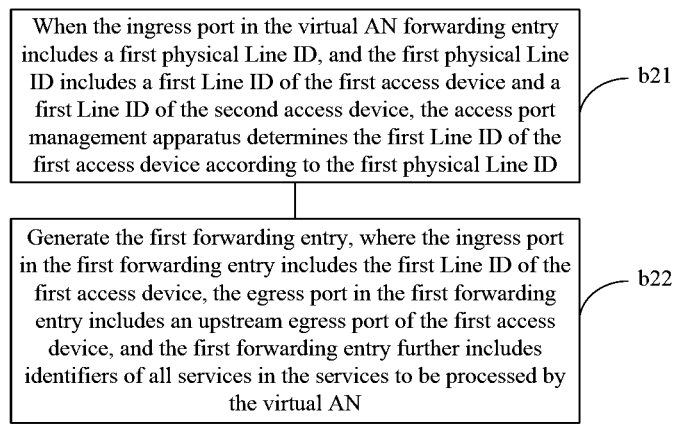
FIG. 7D shows a schematic diagram of a method for generating a first forwarding entry according to an embodiment of the present invention.

As shown in FIG. 7D, optionally, in the situation 2, a method including the following content may also be used to generate the first forwarding entry:

b21. When the ingress port in the virtual AN forwarding entry includes a first physical line identifier (Line ID), and the first physical Line ID includes a first Line ID of the first access device and a first Line ID of the second access device, and the access port management apparatus determines the first Line ID of the first access device according to the first physical Line ID.

b22. Generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

Situation 3

Figure 7E:
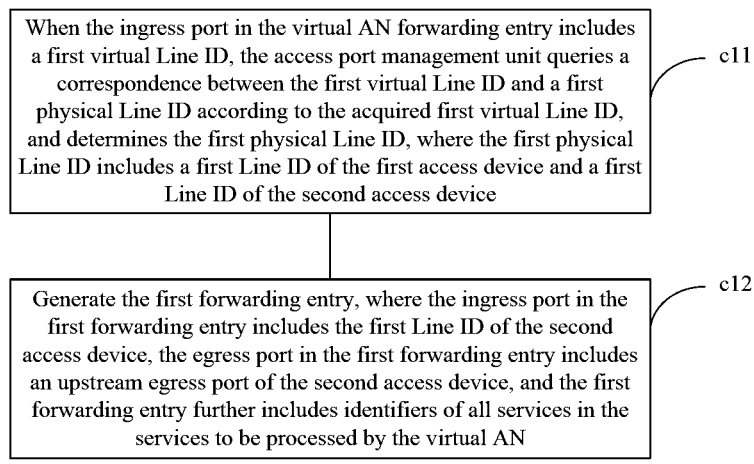
FIG. 7E shows a schematic diagram of a method for generating a first forwarding entry according to an embodiment of the present invention.

When the situation of distribution, which is between the first access device and the second access device, of the services that need to be processed by the virtual AN is that the second access device processes all the services in the services that need to be processed by the virtual AN, and the first device is the second access device. As shown in FIG. 7E, the method for generating the first forwarding entry includes the following content:

c11. When the ingress port in the virtual AN forwarding entry includes a first virtual line identifier (Line ID), the access port management apparatus queries a correspondence between the first virtual Line ID and a first physical Line ID according to the acquired first virtual Line ID, and determines the first physical Line ID, where the first physical Line ID includes a first Line ID of the first access device and a first Line ID of the second access device.

c12. Generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

Figure 7F:
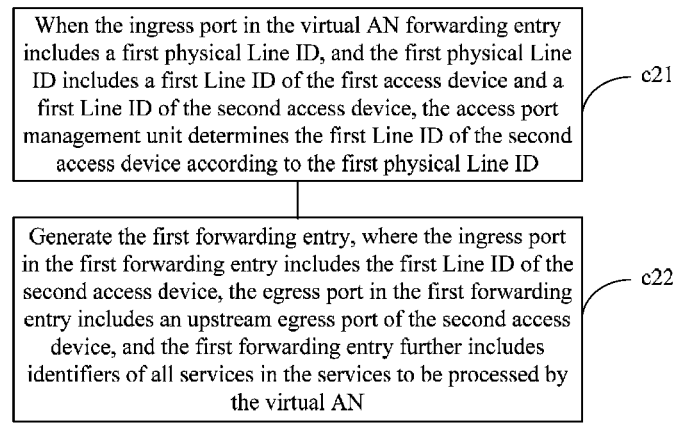
FIG. 7F shows a schematic diagram of a method for generating a first forwarding entry according to an embodiment of the present invention.

As shown in FIG. 7F, optionally, in the situation 3, a method including the following content may also be used to generate the first forwarding entry:

c21. When the ingress port in the virtual AN forwarding entry includes a first physical line identifier (Line ID), and the first physical Line ID includes a first Line ID of the first access device and a first Line ID of the second access device, and the access port management apparatus determines the first Line ID of the second access device according to the first physical Line ID.

c22. Generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

When the services that need to be processed by the virtual AN are PW, the method for generating forwarding entries is as follows:

The first access device 11 is the first device, and the second access device 12 is the second device. In 110, that the access port management apparatus 13 generates a first forwarding entry for a first device in the first access device 11 and the second access device 12 according to the virtual AN forwarding entry includes:

after determining that the first access device 11 is a switching provider edge (SPE for short) device between an internal PW of the virtual AN and an external PW of the virtual AN, the access port management apparatus 13 generates an upstream PW forwarding entry of the first access device according to the virtual AN upstream forwarding entry, where the upstream PW forwarding entry of the first access device includes an ingress port, an upstream label of the internal PW of the virtual AN, the upstream label of the external PW of the virtual AN, and an egress port, the ingress port in the upstream PW forwarding entry of the first access device includes a first Line ID of the first access device, and the egress port in the upstream PW forwarding entry of the first access device is the upstream egress port in the virtual AN upstream forwarding entry. The services that need to be processed by the virtual AN, and in particular, the first access device, include the internal PW of the virtual AN and the external PW of the virtual AN. The upstream label of the internal PW of the virtual AN and the upstream label of the external PW of the virtual AN belong to the identifiers of the services that need to be processed by the virtual AN.

Optionally, that the access port management apparatus 13 generates a first forwarding entry for a first device in the first access device 11 and the second access device 12 according to the virtual AN forwarding entry further includes:

after determining that the first access device 11 is the switching provider edge (SPE for short) device between the internal PW of the virtual AN and the external PW of the virtual AN, the access port management apparatus 13 generates a downstream PW forwarding entry of the first access device according to the virtual AN downstream forwarding entry, where the downstream PW forwarding entry of the first access device includes an ingress port, and the downstream label of the external PW of the virtual AN, a downstream label of the internal PW of the virtual AN, and an egress port. The downstream label of the external PW of the virtual AN and the downstream label of the internal PW of the virtual AN belong to the identifiers of the services that need to be processed by the virtual AN.

It should be noted that because the first access device is the SPE, both the upstream PW forwarding entry of the first access device and the downstream PW forwarding entry of the first access device are PW switching entries. A PW switching entry is used to perform PW label switching for a packet of one PW, so that the packet becomes a packet of another PW.

Optionally, the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

Optionally, when the ingress port in the virtual AN forwarding entry includes a first virtual line identifier Line ID, the access port management apparatus queries a correspondence between the first virtual Line ID and a first physical Line ID according to the acquired first virtual Line ID, and determines the Line ID of the first access device and the Line ID of the second access device, where the first physical Line ID includes the Line ID of the first access device and the Line ID of the second access device.

Optionally, when the ingress port in the virtual AN forwarding entry includes a first physical line identifier Line ID, the access port management apparatus determines the Line ID of the first access device and the Line ID of the second access device according to the first physical Line ID, where the first physical Line ID includes the Line ID of the first access device and the Line ID of the second access device.

120. The access port management apparatus 13 generates a second forwarding entry for a second device in the first access device 11 and the second access device 12 according to the virtual AN forwarding entry, where the second forwarding entry includes an ingress port and an egress port.

In the foregoing situation 1, that is, when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the second access device is the second device. The ingress port in the second forwarding entry includes the first Line ID of the second access device, the egress port in the second forwarding entry includes the upstream egress port of the second access device, and the second forwarding entry further includes identifiers of the second part of services.

In the foregoing situation 2, that is, when the situation of distribution, which is between the first access device and the second access device, of the services that need to be processed by the virtual AN is that the first access device processes all the services in the services that need to be processed by the virtual AN, and the second access device is the second device. The ingress port in the second forwarding entry includes the first Line ID of the second access device, and the egress port in the second forwarding entry includes the upstream egress port of the second access device.

In the foregoing situation 3, that is, when the situation of distribution, which is between the first access device and the second access device, of the services that need to be processed by the virtual AN is that the second access device processes all the services in the services that need to be processed by the virtual AN, and the first access device is the second device. The ingress port in the second forwarding entry includes the first Line ID of the first access device, and the egress port in the second forwarding entry includes the upstream egress port of the first access device.

When the services that need to be processed by the virtual AN are PW, the second forwarding entry is an upstream PW forwarding entry of the second access device, where an ingress port in the upstream PW forwarding entry of the second access device includes the Line ID of the second access device, an egress port in the upstream PW forwarding entry of the second access device includes the upstream egress port of the second access device, and the upstream PW forwarding entry of the second access device further includes the upstream label of the internal PW of the virtual AN. It should be noted that when the services that need to be processed by the virtual AN are PW, after the upstream PW forwarding entry of the first access device and the upstream PW forwarding entry of the second access device are generated, the virtual AN may process upstream PW, so as to implement a part of services. For processing the downstream PW, the method according to this embodiment of the present invention may be used, or other methods may also be used.

In addition, it should be noted that in the embodiment shown in FIG. 6, upstream refers to a direction which is from the second access device to the first access device and continually extending to a network side, and that downstream refers to a direction opposite to the upstream. The virtual AN forwarding entry received by the access port management apparatus is sent by the access management device by using a first control protocol or a first management protocol based on layer 3 of open OSI. When the access port management apparatus needs to send the first forwarding entry or the second forwarding entry to the second access device, the access port management apparatus sends the first forwarding entry or the second forwarding entry by using a second control protocol or a second management protocol based on layer 2 of the open systems interconnection (OSI for short) model. The operation of sending the first forwarding entry or the second forwarding entry by using the second control protocol or second management protocol based on layer 2 of the OSI model may enable the access port management apparatus to implement sending of the first forwarding entry or the second forwarding entry in a case in which a MAC address of the second access device is learned but a management IP address of the second access device is not learned. A management device or a management system in a provider's network sees only a management IP address of a virtual AN, and does not need to see a management IP address of each physical AN in the virtual AN, and therefore does not need to assign a management IP address to a second access device. Therefore, in a case in which numerous second access devices or devices similar to the second access devices exist in a virtual AN, the technical solution of this embodiment may avoid work of assigning management IP addresses to the numerous second access devices or devices similar to the second access devices and correspondingly maintaining the management IP addresses. For an FTTDp scenario, advantages of this embodiment are very obvious. Because numerous second access devices or devices similar to the second access devices, for example, ONUs, exist in positions close to customer premises equipments in the FTTDp scenario, the solution of this embodiment is used to avoid work of configuring and maintaining management IP addresses for the numerous ONUs or similar devices.

As may be known from the foregoing content, a virtual AN may automatically generate forwarding entries for a first access device and a second access device in the virtual AN according to a virtual AN forwarding entry, so that the virtual AN can process services or a part of services related to the virtual AN forwarding entry. Therefore, it is unnecessary to manually configure forwarding entries for the first access device and second access device in the virtual AN respectively, and efficiency is improved greatly.

Figure 8:
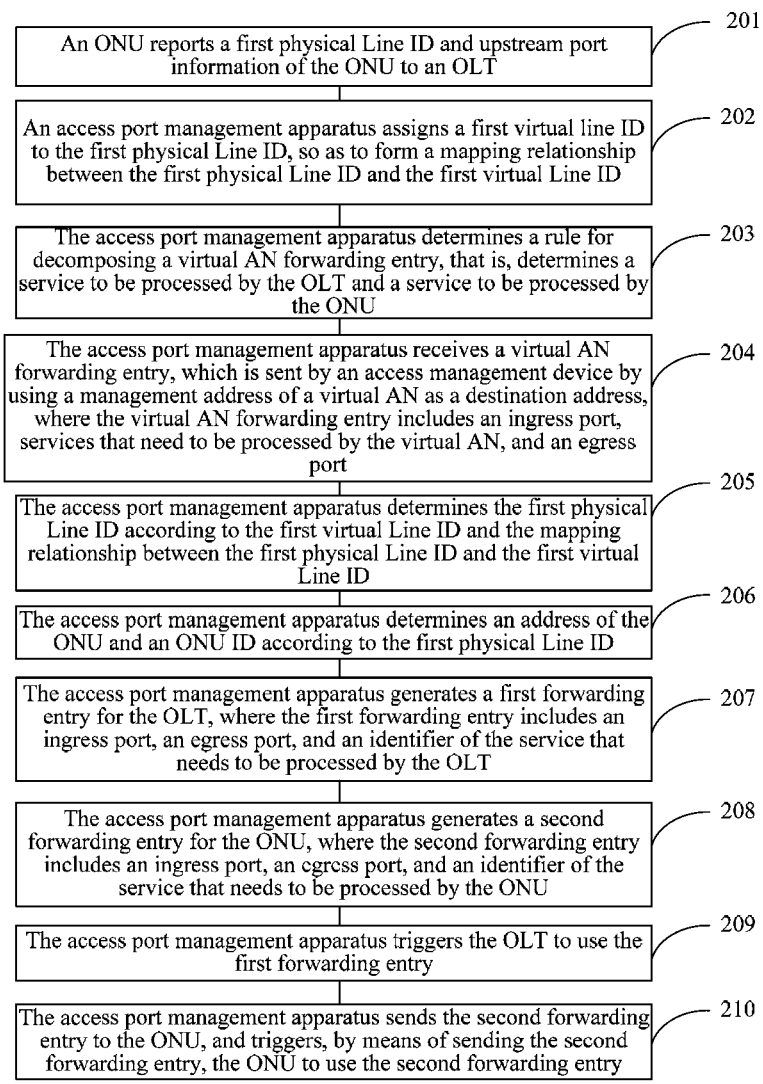
FIG. 8 shows a schematic diagram of a method for generating forwarding entries according to an embodiment of the present invention.

As shown in FIG. 8, a method for generating forwarding entries includes the following content:

201. An ONU reports a first physical Line ID and upstream port information of the ONU to an OLT, where the OLT includes an access port management apparatus. In an optional alternative solution, the access port management apparatus may also be located outside the OLT. Optionally, the ONU further reports an address of the ONU to the OLT, where the address of the ONU may be a MAC address of the ONU or an IP address of the ONU.

202. The access port management apparatus assigns a first virtual line ID to the first physical Line ID, so as to form a mapping relationship between the first physical Line ID and the first virtual Line ID.

When the first physical Line ID includes a Line ID of the ONU and a Line ID of the OLT, an exemplary mapping relationship between the first physical Line ID and the first virtual Line ID is shown in Table 2. In ONU2 ID/Slot1/Port1, the ONU2 ID indicates an identifier of an ONU2, the Slot1 indicates a slot 1 in the ONU, and the Port1 indicates a port 1 in the slot 1 in the ONU. In OLT1 ID/Slot1/Port2, the OLT1 ID indicates an identifier of an OLT1, the Slot1 identifies a slot 1 in the OLT, and the Port2 indicates a port 2 in the slot 1 in the OLT.

TABLE 2

| First physical Line ID | | First virtual Line ID |
|---|---|---|
| Line ID of ONU | Line ID of OLT | |
| ONU2 ID/Slot1/Port1 | OLT1 ID/Slot1/Port2 | Virtual AN ID/Slot 1/Port 1 |

203. The access port management apparatus determines a rule for decomposing a virtual AN forwarding entry, that is, determines a service that needs to be processed by the OLT and a service that needs to be processed by the ONU. In this embodiment, the service to be processed by the OLT is a service virtual local area network (S-VLAN), and the service to be processed by the ONU is a customer virtual local area network (C-VLAN).

204. The access port management apparatus receives a virtual AN forwarding entry sent by an access management device, where the virtual AN forwarding entry includes an ingress port, identifiers of services that need to be processed by a virtual AN, and an egress port. Optionally, the access management device sends the virtual AN forwarding entry by using a first control protocol or a first management protocol based on layer 3 of an OSI model. A destination IP address of a protocol packet carrying the virtual AN forwarding entry is a management IP address of the virtual AN. The first control protocol may be the OpenFlow (Openflow) protocol or access node control protocol (ANCP for short). The first management protocol may be the network configuration (Netconf) protocol or simple network management protocol (SNMP for short). The ingress port in the virtual AN forwarding entry includes the first virtual Line ID. For example, the ingress port in the virtual AN forwarding entry is virtual AN ID/Slot1/Port1. An exemplary virtual AN forwarding entry is shown in Table 3. An ingress port in Table 3 is the first virtual Line ID in Table 2.

TABLE 3

| Ingress port | Service identifier | | Egress port |
|---|---|---|---|
| | C-VID | S-VID | |
| Virtual AN ID/slot1/port1 | 1 | 1 | 1 |

Optionally, the access port management apparatus may receive a virtual AN forwarding table sent by the access management device. A simplified example of the virtual AN forwarding table is shown in Table 4. A physical structure of a virtual AN corresponding to the virtual AN forwarding table shown in Table 4 is shown in FIG. 4A; a logical structure of the corresponding virtual AN is shown in FIG.

4B; and a correspondence between physical Line IDs and virtual Line IDs is shown in Table 1.

TABLE 4

| Ingress port | Service identifier | | Egress port |
|---|---|---|---|
| | C-VID | S-VID | |
| Virtual AN ID/slot1/port1 | 1 | 1 | 1 |
| ... | ... | ... | ... |
| Virtual AN ID/slot2/port1 | 1 | 2 | 1 |
| ... | ... | ... | ... |

205. The access port management apparatus determines the first physical Line ID according to the first virtual Line ID and the mapping relationship between the first physical Line ID and the first virtual Line ID. For example, when the first virtual Line ID is AN ID/Slot1/Port1, it may be determined, according to Table 2, that the first physical Line ID includes ONU2 ID/Slot1/Port1 and OLT1 ID/Slot1/Port2.

206. The access port management apparatus determines an ONU passive optical network (PON for short) layer addressing ID and an address of the ONU.

The ONU PON layer addressing ID is used by the access port management apparatus or the OLT to address the corresponding ONU in a PON layer when the access port management apparatus or the OLT needs to send an entry to the ONU. The address of the ONU may be a MAC address, and may also be an IP address.

It should be noted that step 206 is not required for the access port management apparatus to generate an entry, but required in a process of sending an entry to the ONU.

207. The access port management apparatus generates a first forwarding entry for the OLT, where the first forwarding entry includes an ingress port, an egress port, and an identifier of the service that needs to be processed by the OLT. In this embodiment, the ingress port is the Line ID of the OLT in the first physical Line ID, the egress port is the egress port in the virtual AN forwarding entry, and the identifier of the service that needs to be processed by the OLT is a service virtual local area network identifier (S-VID for short). When the mapping relationship between the first physical Line ID and the first virtual Line ID is shown in Table 2, and the virtual AN forwarding entry is shown in Table 3, the generated first forwarding entry is shown in Table 5. The ingress port in the first forwarding entry is the Line ID of the OLT, the service identifier is the S-VID, and the egress port is the egress port in the virtual AN forwarding entry and its value is 1.

TABLE 5

| Ingress port | Service identifier (S-VID) | Egress port |
|---|---|---|
| OLT1 ID/slot1/port2 | 1 | 1 |

When a simplified example of the virtual AN forwarding table is shown in Table 4, a first forwarding table generated according to the method in 207 is shown in Table 6.

TABLE 6

| Ingress port | Service identifier (S-VID) | Egress port |
|---|---|---|
| OLT1 ID/slot1/port2 | 1 | 1 |
| ... | ... | ... |

TABLE 6-continued

| Ingress port | Service identifier (S-VID) | Egress port |
|---|---|---|
| OLT1 ID/slot1/port1 | 2 | 1 |
| ... | ... | ... |

208. The access port management apparatus generates a second forwarding entry for the ONU, where the second forwarding entry includes an ingress port, an egress port, and an identifier of the service that needs to be processed by the ONU. In this embodiment, the ingress port is the Line ID of the ONU in the first physical Line ID, the egress port is an upstream port of the ONU, and the identifier of the service that needs to be processed by the ONU is a customer virtual local area network identifier (C-VID for short). When the correspondence between the first physical Line ID and the first virtual Line ID is shown in Table 2, and the virtual AN forwarding entry is shown in Table 3, the generated second forwarding entry is shown in Table 7, where X indicates the upstream egress port of the ONU.

TABLE 7

| Ingress port | Service identifier (C-VID) | Egress port |
|---|---|---|
| ONU2 ID/Slot1/Port1 | 1 | X |

When a simplified example of the virtual AN forwarding table is shown in Table 4, a second forwarding table generated according to the method in 208 is shown in Table 8.

TABLE 8

| Ingress port | Service identifier (C-VID) | Egress port |
|---|---|---|
| ONU2 ID/Slot1/Port1 | 1 | X |
| ... | ... | ... |
| ONU1 ID/slot2/port1 | 1 | Y |
| ... | ... | ... |

209. The access port management apparatus triggers the OLT to use the first forwarding entry.

210. The access port management apparatus sends the second forwarding entry to the ONU.

The access port management apparatus or OLT needs to send the second forwarding entry to the ONU. Specifically, the access port management apparatus or OLT uses an ONU PON layer addressing identifier to address the corresponding ONU in the PON layer, and uses the address of the ONU to address the corresponding ONU in a network layer corresponding to the address of the ONU.

Optionally, the access port management apparatus or OLT sends the second forwarding entry to the ONU by using a second control protocol or a second management protocol based on layer 2 of the OSI model, for example, a media access control (MAC for short) layer. The second control protocol is the optical network unit management and control interface (ONU Management and Control Interface, OMCI for short) protocol or Ethernet operation, administration, and maintenance (ETH OAM for short) protocol, and the second management protocol is the ETH OAM protocol. It should be noted that the ETH OAM protocol may be either considered as a control protocol or considered as a management protocol.

After the ONU receives a first data flow from the ingress port in the second forwarding entry, the ONU performs C-VLAN encapsulation on the first data flow according to the C-VID, and then sends an encapsulated first data flow to the OLT according to the egress port in the second forwarding entry. The OLT performs S-VLAN encapsulation on the received first data flow according to the S-VID, and continues to perform forwarding according to the egress port in the first forwarding entry.

In the embodiment shown in FIG. 8, the access port management apparatus generates a forwarding entry for the OLT and ONU respectively according to the virtual AN forwarding entry, so that the OLT and ONU can work in a coordinated manner to jointly process VLAN services that need to be processed by the virtual AN, thereby implementing scheduling of service processing.

In the embodiment shown in FIG. 8, in a case in which the virtual AN includes multiple ONUs, unified planning may be performed on Line IDs of the multiple ONUs to avoid conflicts and reduce an error probability.

Figure 9:
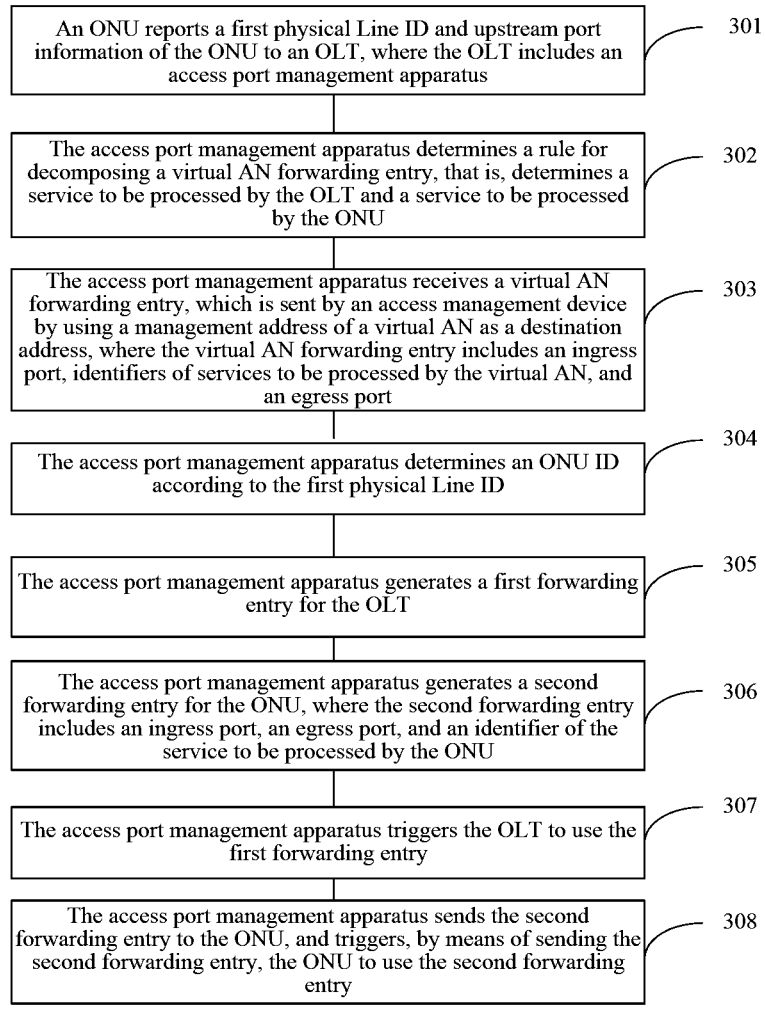
FIG. 9 shows a schematic diagram of a method for generating forwarding entries according to an embodiment of the present invention.

301 As shown in FIG. 9, when an ingress port in a virtual AN forwarding entry includes a physical Line ID, a method for generating forwarding entries includes the following content:

301. An ONU reports a first physical Line ID and upstream port information of the ONU to an OLT, where the OLT includes an access port management apparatus. In an optional alternative solution, the access port management apparatus may also be located outside the OLT. Optionally, the ONU further reports an address of the ONU to the OLT.

302. The access port management apparatus determines a rule for decomposing a virtual AN forwarding entry, that is, determines a service that needs to be processed by the OLT and a service that needs to be processed by the ONU. In this embodiment, the service to be processed by the OLT is a service virtual local area network (S-VLAN), and the service to be processed by the ONU is a customer virtual local area network (C-VLAN).

303. The access port management apparatus receives a virtual AN forwarding entry, which is sent by an access management device by using a management IP address of a virtual AN as a destination address, where the virtual AN forwarding entry includes an ingress port, identifiers of services that need to be processed by the virtual AN, and an egress port. The ingress port in the virtual AN forwarding entry includes the first physical Line ID. An exemplary mapping relationship of the virtual AN forwarding entry is shown in Table 9. In Table 9, the ingress port in the virtual AN forwarding entry includes ONU2 ID/Slot1/Port1 and OLT1 ID/Slot1/Port2, the service identifiers include C-VID and S-VID, and the egress port is 1, which is an upstream egress port of the OLT. In Table 9, the ingress port is the first physical Line ID.

TABLE 9

| Ingress port | | Service identifier | | |
|---|---|---|---|---|
| Line ID of ONU | Line ID of OLT | C-VID | S-VID | Egress port |
| ONU2 ID/Slot1/Port1 | OLT1 ID/Slot1/Port2 | 1 | 1 | 1 |

Optionally, the access port management apparatus may receive a virtual AN forwarding table sent by the access management device. A simplified example of the virtual AN forwarding table is shown in Table 10. A physical structure of a virtual AN corresponding to the virtual AN forwarding table shown in Table 10 is shown in FIG. 4A, and a logical structure of the corresponding virtual AN is shown in FIG. 4B.

TABLE 10

| Ingress port | | Service identifier | | Egress |
|---|---|---|---|---|
| Line ID of ONU | Line ID of OLT | C-VID | S-VID | port |
| ONU2 ID/Slot1/Port1 | OLT1 ID/Slot1/Port2 | 1 | 1 | 1 |
| ... | ... | ... | ... | ... |
| ONU1 ID/Slot2/Port1 | OLT1 ID/Slot1/Port2 | 1 | 2 | 1 |
| ... | ... | ... | ... | ... |

Optionally, the access management device sends the virtual AN forwarding entry by using a first control protocol or a first management protocol based on layer 3 of an OSI model. A destination IP address of a protocol packet carrying the virtual AN forwarding entry is a management IP address of the virtual AN. The first control protocol may be the OpenFlow (Openflow) protocol or access node control protocol (ANCP for short). The first management protocol may be the network configuration (Netconf) protocol or simple network management protocol (SNMP for short).

304. The access port management apparatus determines an ONU passive optical network (PON for short) layer addressing ID and an address of the ONU according to the first physical Line ID.

The ONU PON layer addressing ID is used by the access port management apparatus or the OLT to address the corresponding ONU in a PON layer when the access port management apparatus or the OLT needs to send an entry to the ONU. The address of the ONU may be a MAC address, and may also be an IP address.

It should be noted that step 304 is not required for the access port management apparatus to generate an entry, but required in a process of sending an entry to the ONU.

305. The access port management apparatus generates a first forwarding entry for the OLT, where the first forwarding entry includes an ingress port, an egress port, and an identifier of the service that needs to be processed by the OLT. In this embodiment, the ingress port is the Line ID of the OLT in the first physical Line ID, the egress port is the egress port in the virtual AN forwarding entry, and the identifier of the service that needs to be processed by the OLT is a service virtual local area network identifier (S-VID for short). When the virtual AN forwarding entry is shown in Table 9, the generated first forwarding entry is shown in Table 5. When the virtual AN forwarding table is shown in Table 10, the generated first forwarding table is shown in Table 6.

306. The access port management apparatus generates a second forwarding entry for the ONU, where the second forwarding entry includes an ingress port, an egress port, and an identifier of the service that needs to be processed by the ONU. In this embodiment, the ingress port is the Line ID of the ONU in the first physical Line ID, the egress port is an upstream port of the ONU, and the identifier of the service that needs to be processed by the ONU is a customer virtual local area network identifier (C-VID for short). When the virtual AN forwarding entry is shown in Table 9, the generated second forwarding entry is shown in Table 7. When the virtual AN forwarding table is shown in Table 10, the generated second forwarding table is shown in Table 8.

307. The access port management apparatus triggers the OLT to use the first forwarding entry.

308. The access port management apparatus sends the second forwarding entry to the ONU.

The access port management apparatus or OLT needs to send the second forwarding entry to the ONU. Specifically, the access port management apparatus or OLT uses an ONU PON layer addressing identifier to address the corresponding ONU in the PON layer, and uses the address of the ONU to address the corresponding ONU in a network layer corresponding to the address of the ONU.

Optionally, the access port management apparatus or OLT sends the second forwarding entry to the ONU by using a second control protocol or a second management protocol based on layer 2 of the OSI model. The second control protocol is the optical network unit management and control interface (ONU Management and Control Interface, OMCI for short) protocol, or ETH OAM protocol, for example, the Ethernet operation, administration, and maintenance (ETH OAM for short) protocol, and the second management protocol is ETH OAM. It should be noted that the ETH OAM protocol may be either considered as a control protocol or considered as a management protocol.

After the ONU receives a first data flow from the ingress port in the second forwarding entry, the ONU performs C-VLAN encapsulation on the first data flow according to the C-VID, and then sends an encapsulated first data flow to the OLT according to the egress port in the second forwarding entry. The OLT performs S-VLAN encapsulation on the received first data flow according to the S-VID, and continues to perform forwarding according to the egress port in the first forwarding entry.

In the embodiment shown in FIG. 9, in a case in which the virtual AN includes multiple ONUs, unified planning may be performed on Line IDs of the multiple ONUs to avoid conflicts and reduce an error probability.

In the embodiment shown in FIG. 9, the access port management apparatus generates a forwarding entry for the OLT and ONU respectively according to the virtual AN forwarding entry, so that the OLT and ONU can work in a coordinated manner to jointly process VLAN services that need to be processed by the virtual AN, thereby implementing scheduling of service processing.

Figure 10:
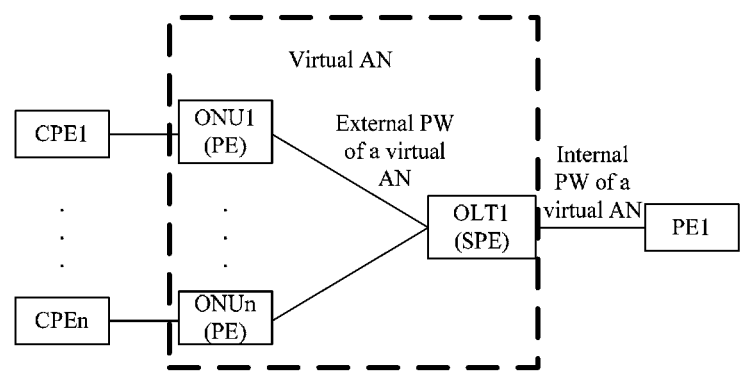
FIG. 10 shows a schematic diagram of a network running a pseudo wire service according to an embodiment of the present invention.

In a network shown in FIG. 10, a virtual AN includes an OLT1 and n ONUs, where each ONU is connected to a corresponding CPE. Each ONU is a PE device close to a CPE shown in FIG. 10. An OLT is connected to a PE1 that is a PE device on another side in the network, that is, the OLT1 is located between the ONU and the PE1. An external PW of the virtual AN needs to be established between the OLT1 and the PE1. An internal PW of the virtual AN needs to be established between the OLT1 and a part or all of the n ONUs. The OLT1 is located between the external PW of the virtual AN and an internal PW of the virtual AN, and its role is an SPE. In the network shown in FIG. 10, the virtual AN externally presents a single provider edge (PE for short) device as a whole. A multiprotocol label switching (MPLS for short) peer sees the virtual AN other than a discrete ONU or OLT. A data plane of the PE is implemented in the ONU. The OLT works as an SPE to implement PW switching. A control plane of the PE is implemented in the OLT. The virtual AN externally interconnects MPLS signaling of a metropolitan area network by using an "MPLS controller". MPLS signaling in an access segment (in the virtual AN) is implemented by using a first control protocol or a first management protocol based on layer 3 of an OSI model. The ONU does not need to implement an IP or MPLS control plane.

Figure 11:
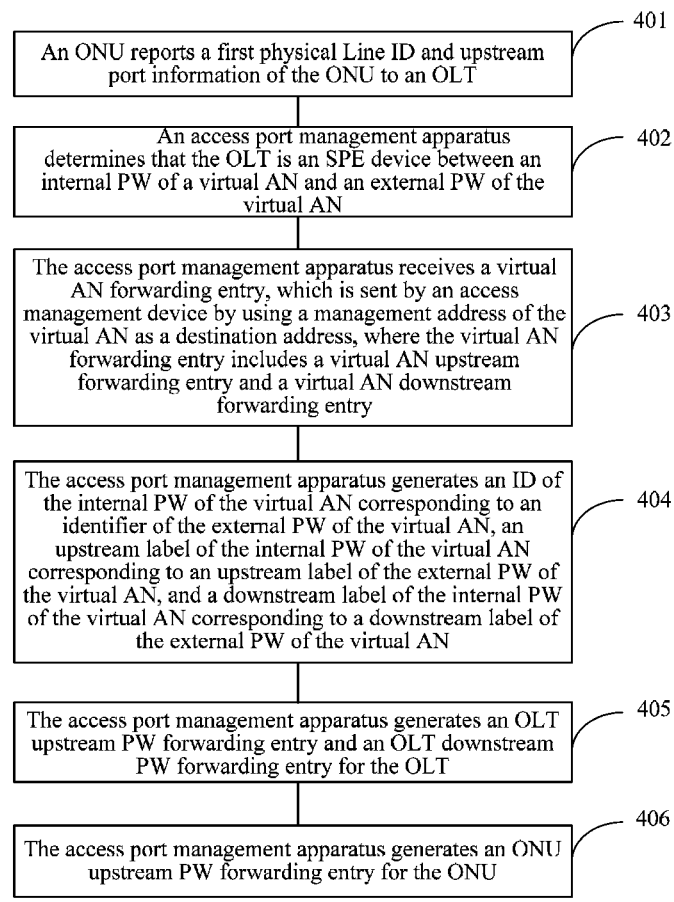
FIG. 11 shows a schematic diagram of a method for generating forwarding entries according to an embodiment of the present invention.

On a basis of the network shown in FIG. 10, as shown in FIG. 11, a method for generating forwarding entries includes the following content:

401. An ONU reports a first physical Line ID and upstream egress port information of the ONU to an OLT. Optionally, the ONU further reports an address of the ONU to the OLT. The OLT includes an access port management apparatus. In an optional alternative solution, the access port management apparatus may also be disposed in another device outside the OLT. The ONU in 401 may be any one of n ONUs in FIG. 10.

402. The access port management apparatus determines that the OLT is an SPE device between an internal PW of a virtual AN and an external PW of the virtual AN that are to be established. The internal PW of the virtual AN is a PW that passes through the OLT and ONU. The external PW of the virtual AN is a PW between the OLT and a PE outside the virtual AN.

After determining that the OLT is the SPE device, the access port management apparatus may correspondingly determine PW labels that need to be processed by the ONU and OLT respectively. In this embodiment, the PW labels that need to be processed by the OLT include an upstream label of the external PW of the virtual AN, an upstream label of the internal PW of the virtual AN, a downstream label of the external PW of the virtual AN, and a downstream label of the internal PW of the virtual AN. The PW labels that need to be processed by the ONU include the upstream label of the internal PW of the virtual AN and the downstream label of the internal PW of the virtual AN.

403. The access port management apparatus receives a virtual AN forwarding entry, which is sent by an access management device by using a management IP address of the virtual AN as a destination address, where the virtual AN forwarding entry includes a virtual AN upstream forwarding entry and a virtual AN downstream forwarding entry.

The virtual AN upstream forwarding entry includes an upstream ingress port, an identifier of the external PW of the virtual AN, the upstream label of the external PW of the virtual AN, and an upstream egress port. For example, in the virtual AN upstream forwarding entry in this embodiment, a value of the identifier of the external PW of the virtual AN may be 1, and the upstream ingress port includes the first physical Line ID. Optionally, the first physical Line ID includes a Line ID of the ONU and a Line ID of the OLT. A value of the Line ID of the ONU is ONU2 ID/Slot1/Port1, and a value of the Line ID of the OLT is OLT1 ID/Slot1/Port2. The upstream egress port includes an upstream egress port of the OLT, and in this embodiment, its value may be 1. A value of the upstream label of the external PW of the virtual AN in this embodiment may be 11111. An exemplary virtual AN upstream forwarding entry in this embodiment is shown in Table 11.

TABLE 11

| Upstream ingress port | | Identifier of external PW | Upstream label of external PW | Upstream egress port |
|---|---|---|---|---|
| Line ID of ONU | Line ID of OLT | | | |
| ONU2 ID/Slot1/Port1 | OLT1 ID/Slot1/Port2 | 1 | 11111 | 1 |

It should be noted that Table 11 shows only an example of a virtual AN upstream forwarding entry when an internal PW of the virtual AN is established between the OLT1 and one ONU of the n ONUs in FIG. 10. Internal PWs of the virtual AN may be established among the OLT1 and multiple ONUs or between the OLT1 and each ONU. In this case, corresponding multiple virtual AN upstream forwarding entries are generated correspondingly. The multiple virtual AN upstream forwarding entries may be included in a same virtual AN upstream forwarding table. Table 12 is a simplified example of a virtual AN upstream forwarding table.

TABLE 12

| Upstream ingress port | | | | |
|---|---|---|---|---|
| Line ID of ONU | Line ID of OLT | Identifier of external PW | Upstream label of external PW | Upstream egress port |
| ONU2 ID/Slot1/Port1 | OLT1 ID/Slot1/Port2 | 1 | 11111 | 1 |
| ... | ... | ... | ... | ... |
| ONU1 ID/Slot2/Port1 | OLT1 ID/Slot1/Port1 | 2 | 33333 | 1 |

The virtual AN downstream forwarding entry includes a downstream ingress port, the identifier of the external PW of the virtual AN, the downstream label of the external PW of the virtual AN, and a downstream egress port. The downstream ingress port in the virtual AN downstream forwarding entry is the upstream egress port in the virtual AN upstream forwarding entry. The downstream egress port in the virtual AN downstream forwarding entry is the upstream ingress port in the virtual AN upstream forwarding entry. A value of the downstream label of the external PW of the virtual AN in this embodiment may be 22222. An exemplary virtual AN downstream forwarding entry in this embodiment is shown in Table 13.

TABLE 13

| | | | Downstream egress port | |
|---|---|---|---|---|
| Downstream ingress port | Identifier of external PW | Downstream label of external PW | Line ID of ONU | Line ID of OLT |
| 1 | 1 | 22222 | ONU2 ID/Slot1/Port1 | OLT1 ID/Slot1/Port2 |

It should be noted that Table 13 shows only an example of a virtual AN downstream forwarding entry when an internal PW of the virtual AN is established between the OLT1 and one ONU of n ONUs in FIG. 10. Internal PWs of the virtual AN may be established among the OLT1 and multiple ONUs or each ONU in the n ONUs. In this case, corresponding multiple virtual AN downstream forwarding entries are generated correspondingly. The multiple virtual AN downstream forwarding entries may be included in a same virtual AN downstream forwarding table. Table 14 is a simplified example of a virtual AN downstream forwarding table.

TABLE 14

| | | | Downstream egress port | |
|---|---|---|---|---|
| Downstream ingress port | Identifier of external PW | Downstream label of external PW | Line ID of ONU | Line ID of OLT |
| 1 | 1 | 22222 | ONU2 ID/Slot1/Port1 | OLT1 ID/Slot1/Port2 |
| ... | ... | ... | ... | ... |

TABLE 14-continued

| | | | Downstream egress port | |
|---|---|---|---|---|
| Downstream ingress port | Identifier of external PW | Downstream label of external PW | Line ID of ONU | Line ID of OLT |
| 1 | 2 | 44444 | ONU1 ID/Slot2/Port1 | OLT1 ID/Slot1/Port1 |

404. The access port management apparatus generates an ID of the internal PW of the virtual AN corresponding to an identifier of the external PW of the virtual AN, an upstream label of the internal PW of the virtual AN corresponding to an upstream label of the external PW of the virtual AN, and a downstream label of the internal PW of the virtual AN corresponding to a downstream label of the external PW of the virtual AN. For example, when the ID of the external PW of the virtual AN is 1, the ID of the internal PW of the corresponding virtual AN is 11; when the upstream label of the external PW of the virtual AN is 11111, the corresponding upstream label of the internal PW of the virtual AN is 66666; when the downstream label of the external PW of the virtual AN is 22222, the downstream label of the internal PW of the corresponding virtual AN is 77777.

405. The access port management apparatus generates an OLT upstream PW forwarding entry and an OLT downstream PW forwarding entry for the OLT, where both the OLT upstream PW forwarding entry and the OLT downstream PW forwarding entry are or belong to the first forwarding entry in 110.

The OLT upstream PW forwarding entry includes an ingress port, an egress port, the upstream label of the internal PW of the virtual AN, and the upstream label of the external PW of the virtual AN. The ingress port in the OLT upstream PW forwarding entry includes the Line ID of the OLT. For example, a value of the Line ID of the OLT may be OLT1 ID/Slot1/Port2. The egress port in the OLT upstream PW forwarding entry includes the upstream egress port in the virtual AN upstream forwarding entry. An exemplary OLT upstream PW forwarding entry in this embodiment is shown in Table 15.

TABLE 15

| Ingress port | Upstream label of internal PW of virtual AN | Upstream label of external PW of virtual AN | Egress port |
|---|---|---|---|
| OLT1 ID/Slot1/Port2 | 66666 | 11111 | 1 |

When the virtual AN upstream forwarding table is shown in Table 12, and the virtual AN downstream forwarding table is shown in Table 14, an OLT upstream PW forwarding table is shown in Table 16.

TABLE 16

| Ingress port | Upstream label of internal PW of virtual AN | Upstream label of external PW of virtual AN | Egress port |
|---|---|---|---|
| OLT1 ID/Slot1/Port2 | 66666 | 11111 | 1 |
| ... | ... | ... | ... |
| OLT1 ID/Slot1/Port1 | 88888 | 33333 | 1 |

The OLT downstream PW forwarding entry includes an ingress port, an egress port, the downstream label of the external PW of the virtual AN, and the downstream label of the internal PW of the virtual AN. The ingress port in the OLT downstream PW forwarding entry includes the egress port in the OLT upstream PW forwarding entry. The egress port in the OLT downstream PW forwarding entry includes the ingress port in the OLT upstream PW forwarding entry. An exemplary OLT downstream PW forwarding entry in this embodiment is shown in Table 17.

TABLE 17

| Ingress port | Downstream label of external PW of virtual AN | Downstream label of internal PW of virtual AN | Egress port |
|---|---|---|---|
| 1 | 22222 | 77777 | OLT1 ID/Slot1/Port2 |

When the virtual AN upstream forwarding table is shown in Table 12, and the virtual AN downstream forwarding table is shown in Table 14, an OLT downstream PW forwarding table is shown in Table 18a.

TABLE 18a

| Ingress port | Downstream label of external PW of virtual AN | Downstream label of internal PW of virtual AN | Egress port |
|---|---|---|---|
| 1 | 22222 | 77777 | OLT1 ID/Slot1/Port2 |
| ... | ... | ... | ... |
| 1 | 44444 | 99999 | OLT1 ID/Slot1/Port1 |

406. The access port management apparatus generates an ONU upstream PW forwarding entry for the ONU, where the ONU upstream PW forwarding entry belongs to the second forwarding entry in 120. The ONU upstream PW forwarding entry includes an ingress port, an egress port, and the upstream label of the internal PW of the virtual AN. In the ONU upstream PW forwarding entry, the ingress port includes the Line ID of the ONU. For example, the Line ID of the ONU in this embodiment may be ONU2 ID/Slot1/Port1. The egress port includes an upstream egress port of the ONU. For example, the upstream egress port of the ONU in this embodiment may be a port X. An exemplary ONU upstream PW forwarding entry in this embodiment is shown in Table 18b.

TABLE 18B

| Ingress port | Upstream label of internal PW of virtual AN | Egress port |
|---|---|---|
| ONU2 ID/Slot1/Port1 | 66666 | X |

On a basis of Table 12 and Table 16, an exemplary ONU upstream PW forwarding entry of an ONU1 1 is shown in Table 19.

TABLE 19

| Ingress port | Upstream label of internal PW of virtual AN | Egress port |
|---|---|---|
| ONU1 ID/Slot2/Port1 | 88888 | Y |

In the embodiment shown in FIG. 11, the access port management apparatus generates a PW forwarding entry for the OLT and ONU respectively according to the virtual AN forwarding entry, so that the OLT and ONU can work in a coordinated manner, so as to facilitate processing of PW services that need to be processed by the virtual AN.

The access port management apparatus or OLT needs to send the ONU upstream PW forwarding entry to the ONU. Specifically, the access port management apparatus or OLT uses an ONU PON layer addressing identifier to address the corresponding ONU in a PON layer, and uses the address of the ONU to address the corresponding ONU in a network layer corresponding to the address of the ONU.

After generating the ONU upstream PW forwarding entry for the ONU, the access port management apparatus sends the second forwarding entry to the ONU by using a second control protocol or a second management protocol based on layer 2 of an OSI model. The second control protocol is the optical network unit management and control interface (ONU Management and Control Interface, OMCI for short) protocol, or ETH OAM protocol, for example, the Ethernet operation, administration, and maintenance (ETH OAM for short) protocol, and the second management protocol is the ETH OAM protocol. It should be noted that the ETH OAM protocol may be either considered as a control protocol or considered as a management protocol.

Figure 12:
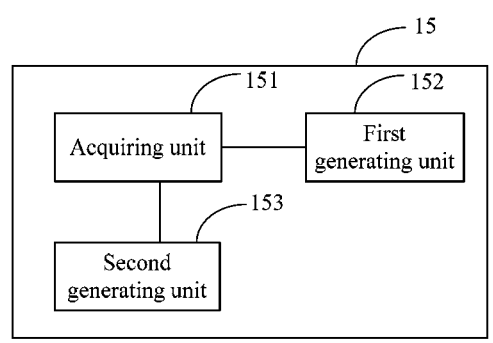
FIG. 12 shows a schematic diagram of an access port management apparatus according to an embodiment of the present invention.

As shown in FIG. 12, this embodiment discloses an access port management apparatus 15. The access port management apparatus can implement functions of an access port management apparatus in any embodiment corresponding to FIG. 1 to FIG. 11, and may also be the same as the access port management apparatus in any embodiment corresponding to FIG. 1 to FIG. 11. As shown in FIG. 1 or FIG. 2, the access port management unit in this embodiment is applied to a virtual access node AN including a first access device and a second access device. The access port management apparatus 15 includes:

an acquiring, unit 151, configured to acquire a virtual AN forwarding entry sent by an access management device, where the virtual AN forwarding entry includes an ingress port, identifiers of services that need to be processed by the virtual AN, and an egress port;

a first generating unit 152, configured to generate a first forwarding entry for a first device in the first access device and the second access device according to the virtual AN forwarding entry, where the first forwarding entry includes an ingress port, an egress port, and an identifier of a service that needs to be processed by the first device; and a second generating unit 153, configured to generate a second forwarding entry for a second device in the first access device and the second access device according to the virtual AN forwarding entry, where the second forwarding entry includes an ingress port and an egress port.

Optionally, the first generating unit 152 is specifically configured to generate the first forwarding entry for the first device according to the virtual AN forwarding entry and according to a situation of distribution, which is between the first access device and the second access device, of the services that need to be processed by the virtual AN.

Figure 13:
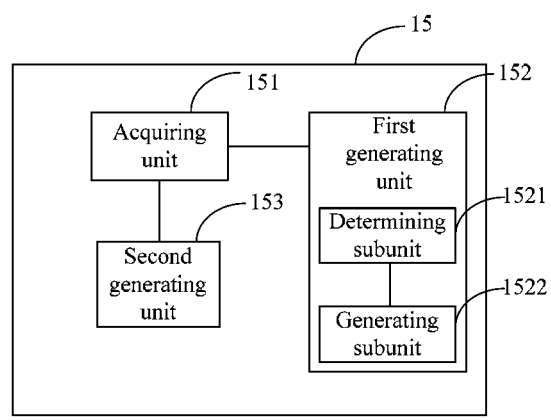
FIG. 13 shows a schematic diagram of an access port management apparatus according to an embodiment of the present invention.

In this case, there are multiple classified situations for generation of the first forwarding entry and the second forwarding entry. For each classified situation, as shown in FIG. 13, the first generating unit 152 specifically includes a corresponding determining subunit 1521 and a corresponding generating subunit 1522.

Classified situation 1: when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device, and the second access device is the second device.

In the classified situation 1, the determining subunit 1521 is a first determining subunit, and the generating subunit 1522 is a first generating subunit.

The first determining subunit is configured to: when the ingress port in the virtual AN forwarding entry includes a first virtual line identifier Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and the first generating subunit is configured to generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

Alternatively, in the classified situation 1, the determining subunit 1521 is a second determining subunit, and the generating subunit 1522 is a second generating subunit.

The second determining subunit is configured to: when the ingress port in the virtual AN forwarding entry includes a first physical line identifier Line ID, and the first physical Line ID includes a first Line ID of the first access device and a first Line ID of the second access device, determine the first Line ID of the first access device according to the first physical Line ID; and the second generating subunit is configured to generate the first forwarding entry, where the ingress port in the first forwarding entry includes the first Line ID of the first access device, the egress port in the first forwarding entry includes an upstream egress port of the first access device, and the first forwarding entry further includes identifiers of the first part of services.

In the classified situation 1, the ingress port in the second forwarding entry includes the first Line ID of the second access device, the egress port in the second forwarding entry includes an upstream egress port of the second access device, and the second forwarding entry further includes identifiers of the second part of services.

Classified situation 2: when the situation of distribution, which is between the first access device and the second access device, of the services that need to be processed by the virtual AN is that the first access device processes all services in the services that need to be processed by the virtual AN, the first access device is the first device, and the second access device is the second device.

In the classified situation 2, the determining subunit 1521 is a third determining subunit, and the generating subunit 1522 is a third generating subunit.

The third determining subunit is configured to: when the ingress port in the virtual AN forwarding entry includes a first virtual line identifier Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and the third generating subunit is configured to generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

Alternatively, in the classified situation 2, the determining subunit 1521 is a fourth determining subunit, and the generating subunit 1522 is a fourth generating subunit.

The fourth determining subunit is configured to: when the ingress port in the virtual AN forwarding entry includes a first physical line identifier Line ID, and the first physical Line ID includes a first Line ID of the first access device and a first Line ID of the second access device, determine the first Line ID of the first access device according to the first physical Line ID; and the fourth generating subunit is configured to generate the first forwarding entry, where the ingress port in the first forwarding entry includes the first Line ID of the first access device, the egress port in the first forwarding entry includes an upstream egress port of the first access device, and the first forwarding entry further includes identifiers of all the services in the services that need to be processed by the virtual AN.

In the classified situation 2, the ingress port in the second forwarding entry includes the first Line ID of the second access device, and the egress port in the second forwarding entry includes an upstream egress port of the second access device.

Classified situation 3: when the situation of distribution, which is between the first access device and the second access device, of the services that need to be processed by the virtual AN is that the second access device processes all services in the services that need to be processed by the virtual AN, the second access device is the first device, and the first access device is the second device.

In the classified situation 3, the determining subunit 1521 is a fifth determining subunit, and the generating subunit 1522 is a fifth generating subunit.

The fifth determining subunit is configured to: when the ingress port in the virtual AN forwarding entry includes a first virtual line identifier Line ID, query a correspondence between the first virtual Line ID and a first physical Line ID according to the acquired first virtual Line ID, and determine the first physical Line ID, where the first physical Line ID includes a first Line ID of the first access device and a first Line ID of the second access device; and the fifth generating subunit is configured to generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

Alternatively, in the classified situation 3, the determining subunit 1521 is a sixth determining subunit, and the generating subunit 1522 is a sixth generating subunit.

The sixth determining subunit is configured to: when the ingress port in the virtual AN forwarding entry includes a first physical line identifier Line ID, and the first physical Line ID includes a first Line ID of the first access device and a first Line ID of the second access device, determine the first Line ID of the second access device according to the first physical Line ID; and the sixth generating subunit is configured to generate the first forwarding entry, where the ingress port in the first forwarding entry includes the first Line ID of the second access device, the egress port in the first forwarding entry includes an upstream egress port of the second access device, and the first forwarding entry further includes identifiers of all the services in the services that need to be processed by the virtual AN.

In the classified situation 3, the ingress port in the second forwarding entry includes the first Line ID of the first access device, and the egress port in the second forwarding entry includes an upstream egress port of the first access device.

Optionally, when the first generating unit is specifically configured to generate the first forwarding entry for the first device according to the virtual AN forwarding entry and according to the situation of distribution, which is between the first access device and the second access device, of the services that need to be processed by the virtual AN, the services that need to be processed by the virtual AN may be virtual local area network (VLAN for short).

Optionally, when the services that need to be processed by the virtual AN are pseudo wire, the first access device is the first device, and the second access device is the second device;

the acquiring unit 151 is specifically configured to:

acquire a virtual AN upstream forwarding entry and a virtual AN downstream forwarding entry that are sent by the access management device, where the virtual AN upstream forwarding entry includes an upstream ingress port, an identifier of an external PW of the virtual AN, an upstream label of the external PW of the virtual AN, and an upstream egress port, and the virtual AN downstream forwarding entry includes a downstream ingress port, the identifier of the external PW of the virtual AN, a downstream label of the external PW of the virtual AN, and a downstream egress port.

The first generating unit 152 is specifically configured to:

after the access port management apparatus determines that the first access device is a switching provider edge SPE device between an internal PW of the virtual AN and the external PW of the virtual AN, generate an upstream PW forwarding entry of the first access device according to the virtual AN upstream forwarding entry, where the upstream PW forwarding entry of the first access device includes an ingress port, an upstream label of the internal PW of the virtual AN, the upstream label of the external PW of the virtual AN, and an egress port, the ingress port in the upstream PW forwarding entry of the first access device includes a first Line ID of the first access device, the egress port in the upstream PW forwarding entry of the first access device is the upstream egress port in the virtual AN upstream forwarding entry, and the upstream PW forwarding entry of the first access device is a PW switching entry.

When the services that need to be processed by the virtual AN are pseudo wire, optionally, the second forwarding entry is an upstream PW forwarding entry of the second access device, where an ingress port in the upstream PW forwarding entry of the second access device includes a Line ID of the second access device, an egress port in the upstream PW forwarding entry of the second access device includes an upstream egress port of the second access device, and the upstream PW forwarding entry of the second access device further includes the upstream label of the internal PW of the virtual AN.

When the services that need to be processed by the virtual AN are pseudo wire, optionally, the first generating unit 152 is further specifically configured to:

after the access port management apparatus 15 determines that the first access device is the switching provider edge SPE device between the internal PW of the virtual AN and the external PW of the virtual AN, generate a downstream PW forwarding entry of the first access device according to the virtual AN downstream forwarding entry, where the downstream PW forwarding entry of the first access device includes an ingress port, the downstream label of the external PW of the virtual AN, a downstream label of the internal PW of the virtual AN, and an egress port, and the downstream PW forwarding entry of the first access device is a PW switching entry.

When the services that need to be processed by the virtual AN are pseudo wire, optionally, the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

Figure 14:
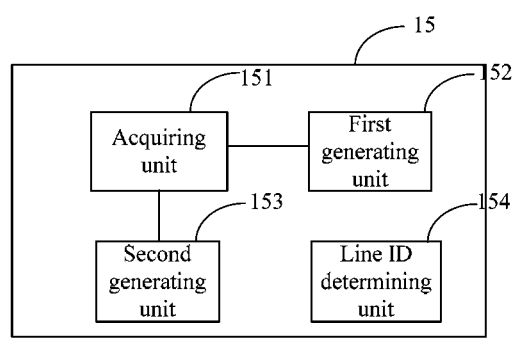
FIG. 14 shows a schematic diagram of an access port management apparatus according to an embodiment of the present invention.

When the services that need to be processed by the virtual AN are pseudo wire, optionally, as shown in FIG. 14, the apparatus 15 includes a line identifier Line ID determining unit 154.

The Line ID determining unit 154 is configured to:

when the ingress port in the virtual AN forwarding entry includes a first virtual line identifier Line ID, query a correspondence between the first virtual Line ID and a first physical Line ID according to the acquired first virtual Line ID, and determine the Line ID of the first access device and the Line ID of the second access device, where the first physical Line ID includes the Line ID of the first access device and the Line ID of the second access device; or the Line ID determining unit 154 is configured to:

when the ingress port in the virtual AN forwarding entry includes a first physical line identifier Line ID, determine the Line ID of the first access device and the Line ID of the second access device according to the first physical Line ID, where the first physical Line ID includes the Line ID of the first access device and the Line ID of the second access device.

This embodiment respectively discloses units included in the access port management apparatus when the services that need to be processed by the virtual AN are VLAN and pseudo wire.

Optionally, in this embodiment, the virtual Line ID includes a device identifier of the virtual AN and a first port number of the virtual AN; the first Line ID of the first access device includes a device identifier of the first access device and a first port number of the first access device; and the first Line ID of the second access device includes a device identifier of the second access device and a first port number of the second access device.

Optionally, in this embodiment, the first access device is an optical line terminal (OLT for short), and the second access device is a first optical network unit (ONU for short), a first optical network terminal (ONT for short), a first multi-dwelling unit (MDU for short), or a first subscriber line access multiplexer (DSLAM for short); or the first access device is a first DSLAM, and the second access device is a second DSLAM; or the first access device is a DSLAM management device, and the second access device is a DSLAM.

Optionally, in this embodiment, the virtual AN forwarding entry received by the access port management unit is sent by the access management device by using a first control protocol or a first management protocol based on layer 3 of an open systems interconnection (OSI for short) model; and when the access port management unit needs to send the first forwarding entry or the second forwarding entry to the second access device, the access port management unit sends the first forwarding entry or the second forwarding entry by using a second control protocol or a second management protocol based on layer 2 of the OSI model.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for generating forwarding entries for devices in an optical network, wherein the optical network comprises a virtual access node (AN), wherein the virtual AN comprises a first access device, a second access device, and an access port management apparatus, and the method comprises:
    acquiring, by the access port management apparatus, a virtual AN forwarding entry sent by an access management device, wherein the virtual AN forwarding entry comprises an ingress port, identifiers of services that need to be processed by the virtual AN, and an egress port;
    generating, by the access port management apparatus, a first forwarding entry for a first device in the first access device and the second access device according to the virtual AN forwarding entry, wherein the first forwarding entry comprises an ingress port, an egress port, and an identifier of a service that needs to be processed by the first device; and
    generating, by the access port management apparatus, a second forwarding entry for a second device in the first access device and the second access device according to the virtual AN forwarding entry, wherein the second forwarding entry comprises an ingress port and an egress port.

2. The method according to claim 1, wherein:
    the generating, by the access port management apparatus, a first forwarding entry for a first device in the first access device and the second access device according to the virtual AN forwarding entry, comprises:
    generating, by the access port management apparatus, the first forwarding entry for the first device according to a situation of distribution, which is between the first access device and the second access device, of the services that need to be processed by the virtual AN, and according to the virtual AN forwarding entry.

3. The method according to claim 2, wherein:
    when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device, and the second access device is the second device; and
    the generating the first forwarding entry comprises:
    when the ingress port in the virtual AN forwarding entry comprises a first virtual line identifier (Line ID), querying, by the access port management apparatus, a correspondence between the first virtual Line ID and a first physical Line ID according to the acquired first virtual Line ID, and determining the first physical Line ID, wherein the first physical Line ID comprises a first Line ID of the first access device and a first Line ID of the second access device; and generating the first forwarding entry, wherein the ingress port in the first forwarding entry comprises the first Line ID of the first access device, the egress port in the first forwarding entry comprises an upstream egress port of the first access device, and the first forwarding entry further comprises identifiers of the first part of services;
    or
    the generating the first forwarding entry comprises:
    when the ingress port in the virtual AN forwarding entry comprises a first physical line identifier Line ID, and the first physical Line ID comprises a first Line ID of the first access device and a first Line ID of the second access device, determining, by the access port management apparatus, the first Line ID of the first access device according to the first physical Line ID; and generating the first forwarding entry, wherein the ingress port in the first forwarding entry comprises the first Line ID of the first access device, the egress port in the first forwarding entry comprises an upstream egress port of the first access device, and the first forwarding entry further comprises identifiers of the first part of services.

4. The method according to claim 3, wherein the ingress port in the second forwarding entry comprises the first Line ID of the second access device, the egress port in the second forwarding entry comprises an upstream egress port of the second access device, and the second forwarding entry further comprises identifiers of the second part of services.

5. The method according to claim 2, wherein:
    when the situation of distribution, which is between the first access device and the second access device, of the services that need to be processed by the virtual AN is that the first access device processes all services in the services that need to be processed by the virtual AN, the first access device is the first device, and the second access device is the second device; and
    the generating the first forwarding entry comprises:
    when the ingress port in the virtual AN forwarding entry comprises a first virtual line identifier Line ID, querying, by the access port management apparatus, a correspondence between the first virtual Line ID and a first physical Line ID according to the acquired first virtual Line ID, and determining the first physical Line ID, wherein the first physical Line ID comprises a first Line ID of the first access device and a first Line ID of the second access device; and generating the first forwarding entry, wherein the ingress port in the first forwarding entry comprises the first Line ID of the first access device, the egress port in the first forwarding entry comprises an upstream egress port of the first access device, and the first forwarding entry further comprises identifiers of all the services in the services that need to be processed by the virtual AN; or the generating the first forwarding entry comprises:
when the ingress port in the virtual AN forwarding entry comprises a first physical line identifier Line ID, and the first physical Line ID comprises a first Line ID of the first access device and a first Line ID of the second access device, determining, by the access port management apparatus, the first Line ID of the first access device according to the first physical Line ID; and generating the first forwarding entry, wherein the ingress port in the first forwarding entry comprises the first Line ID of the first access device, the egress port in the first forwarding entry comprises an upstream egress port of the first access device, and the first forwarding entry further comprises identifiers of all the services in the services that need to be processed by the virtual AN.

6. The method according to claim 5, wherein the ingress port in the second forwarding entry comprises the first Line ID of the second access device, and the egress port in the second forwarding entry comprises an upstream egress port of the second access device.

7. The method according to claim 2, wherein: when the situation of distribution, which is between the first access device and the second access device, of the services that need to be processed by the virtual AN is that the second access device processes all services in the services that need to be processed by the virtual AN, the second access device is the first device, and the first access device is the second device; and
the generating the first forwarding entry comprises:
when the ingress port in the virtual AN forwarding entry comprises a first virtual line identifier Line ID, querying, by the access port management apparatus, a correspondence between the first virtual Line ID and a first physical Line ID according to the acquired first virtual Line ID, and determining the first physical Line ID, wherein the first physical Line ID comprises a first Line ID of the first access device and a first Line ID of the second access device; and generating the first forwarding entry, wherein the ingress port in the first forwarding entry comprises the first Line ID of the second access device, the egress port in the first forwarding entry comprises an upstream egress port of the second access device, and the first forwarding entry further comprises identifiers of all the services in the services that need to be processed by the virtual AN; or
the generating the first forwarding entry comprises:
when the ingress port in the virtual AN forwarding entry comprises a first physical line identifier Line ID, and the first physical Line ID comprises a first Line ID of the first access device and a first Line ID of the second access device, determining, by the access port management apparatus, the first Line ID of the second access device according to the first physical Line ID; and generating the first forwarding entry, wherein the ingress port in the first forwarding entry comprises the first Line ID of the second access device, the egress port in the first forwarding entry comprises an upstream egress port of the second access device, and the first forwarding entry further comprises identifiers of all the services in the services that need to be processed by the virtual AN.

8. The method according to claim 7, wherein the ingress port in the second forwarding entry comprises the first Line ID of the first access device, and the egress port in the second forwarding entry comprises an upstream egress port of the first access device.

9. The method according to claim 2, wherein the services are virtual local area network (VLAN) services.

10. The method according to claim 1, wherein the first access device is the first device, and the second access device is the second device;
the acquiring, by the access port management apparatus, a virtual AN forwarding entry sent by an access management device, comprises:
acquiring, by the access port management apparatus, a virtual AN upstream forwarding entry and a virtual AN downstream forwarding entry that are sent by the access management device, wherein the virtual AN upstream forwarding entry comprises an upstream ingress port, an identifier of an external pseudo wire (PW) of the virtual AN, an upstream label of the external PW of the virtual AN, and an upstream egress port, and the virtual AN downstream forwarding entry comprises a downstream ingress port, the identifier of the external PW of the virtual AN, a downstream label of the external PW of the virtual AN, and a downstream egress port; and
the generating, by the access port management apparatus, a first forwarding entry for a first device in the first access device and the second access device according to the virtual AN forwarding entry, comprises:
after determining that the first access device is a switching provider edge (SPE) device between an internal PW of the virtual AN and the external PW of the virtual AN, generating, by the access port management apparatus, an upstream PW forwarding entry of the first access device according to the virtual AN upstream forwarding entry, wherein the upstream PW forwarding entry of the first access device comprises an ingress port, an upstream label of the internal PW of the virtual AN, the upstream label of the external PW of the virtual AN, and an egress port, the ingress port in the upstream PW forwarding entry of the first access device comprises a first Line ID of the first access device, the egress port in the upstream PW forwarding entry of the first access device is the upstream egress port in the virtual AN upstream forwarding entry, and the upstream PW forwarding entry of the first access device is a PW switching entry.

11. The method according to claim 10, wherein the second forwarding entry is an upstream PW forwarding entry of the second access device, wherein an ingress port in the upstream PW forwarding entry of the second access device comprises a Line ID of the second access device, an egress port in the upstream PW forwarding entry of the second access device comprises an upstream egress port of the second access device, and the upstream PW forwarding entry of the second access device further comprises the upstream label of the internal PW of the virtual AN.

12. The method according to claim 10, wherein the generating, by the access port management apparatus, a first forwarding entry for a first device in the first access device and the second access device according to the virtual AN forwarding entry, further comprises:
after determining that the first access device is the switching provider edge (SPE) device between the internal PW of the virtual AN and the external PW of the virtual AN, generating, by the access port management apparatus, a downstream PW forwarding entry of the first access device according to the virtual AN downstream forwarding entry, wherein the downstream PW forwarding entry of the first access device comprises an ingress port, the downstream label of the external PW of the virtual AN, a downstream label of the internal PW of the virtual AN, and an egress port, and the downstream PW forwarding entry of the first access device is a PW switching entry.

13. The method according to claim 12, wherein the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

14. The method according to claim 10, wherein:
when the ingress port in the virtual AN forwarding entry comprises a first virtual line identifier Line ID, the access port management apparatus queries a correspondence between the first virtual Line ID and a first physical Line ID according to the acquired first virtual Line ID, and determines the first Line ID of the first access device and the Line ID of the second access device, wherein the first physical Line ID comprises the Line ID of the first access device and the Line ID of the second access device; or
when the ingress port in the virtual AN forwarding entry comprises a first physical line identifier Line ID, the access port management apparatus determines the first Line ID of the first access device and the Line ID of the second access device according to the first physical Line ID, wherein the first physical Line ID comprises the first Line ID of the first access device and the Line ID of the second access device.

15. The method according to claim 3, wherein:
the virtual Line ID comprises a device identifier of the virtual AN and a first port number of the virtual AN;
the first Line ID of the first access device comprises a device identifier of the first access device and a first port number of the first access device; and
the first Line ID of the second access device comprises a device identifier of the second access device and a first port number of the second access device.

16. The method according to claim 1, wherein:
the first access device is an optical line terminal (OLT), and the second access device is a first optical network unit (ONU), a first optical network terminal (ONT), a first multi-dwelling unit (MDU), or a first digital subscriber line access multiplexer (DSLAM); or
the first access device is a first digital subscriber line access multiplexer (DSLAM), and the second access device is a second DSLAM; or
the first access device is a digital subscriber line access multiplexer (DSLAM) management device, and the second access device is a DSLAM.

17. The method according to claim 1, wherein the virtual AN forwarding entry received by the access port management apparatus is sent by the access management device by using a first control protocol or a first management protocol based on layer 3 of an open systems interconnection (OSI) model; and
when the access port management apparatus needs to send the first forwarding entry or the second forwarding entry to the second access device, the access port management apparatus sends the first forwarding entry or the second forwarding entry by using a second control protocol or a second management protocol based on layer 2 of the open systems interconnection (OSI) model.

18. An access port management apparatus, applied to a virtual access node (AN) that comprises a first access device and a second access device, wherein the access port management apparatus comprises:
an acquiring unit, configured to acquire a virtual AN forwarding entry sent by an access management device, wherein the virtual AN forwarding entry comprises an ingress port, identifiers of services that need to be processed by the virtual AN, and an egress port;
a first generating unit, configured to generate a first forwarding entry for a first device in the first access device and the second access device according to the virtual AN forwarding entry, wherein the first forwarding entry comprises an ingress port, an egress port, and an identifier of a service that needs to be processed by the first device; and
a second generating unit, configured to generate a second forwarding entry for a second device in the first access device and the second access device according to the virtual AN forwarding entry, wherein the second forwarding entry comprises an ingress port and an egress port.

19. The apparatus according to claim 18, wherein:
the first generating unit is specifically configured to:
generate the first forwarding entry for the first device according to a situation of distribution, which is between the first access device and the second access device, of the services that need to be processed by the virtual AN, and according to the virtual AN forwarding entry.

20. The apparatus according to claim 19, wherein:
when the situation of distribution, which is between the first access device and the second access device, of the services that need to be processed by the virtual AN is that the first access device processes a first part of services in the services that need to be processed by the virtual AN, and that the second access device processes a second part of services in the services that need to be processed by the virtual AN, the first access device is the first device, and the second access device is the second device; and
the first generating unit comprises:
a first determining subunit, configured to: when the ingress port in the virtual AN forwarding entry comprises a first virtual line identifier (Line ID), query a correspondence between the first virtual Line ID and a first physical Line ID according to the acquired first virtual Line ID, and determine the first physical Line ID, wherein the first physical Line ID comprises a first Line ID of the first access device and a first Line ID of the second access device; and
a first generating subunit, configured to generate the first forwarding entry, wherein the ingress port in the first forwarding entry comprises the first Line ID of the first access device, the egress port in the first forwarding entry comprises an upstream egress port of the first access device, and the first forwarding entry further comprises identifiers of the first part of services; or
the first generating unit comprises:
a second determining subunit, configured to: when the ingress port in the virtual AN forwarding entry comprises a first physical line identifier Line ID, and the first physical Line ID comprises a first Line ID of the first access device and a first Line ID of the second access device, determine the first Line ID of the first access device according to the first physical Line ID; and
a second generating subunit, configured to generate the first forwarding entry, wherein the ingress port in the first forwarding entry comprises the first Line ID of the first access device, the egress port in the first forwarding entry comprises an upstream egress port of the first access device, and the first forwarding entry further comprises identifiers of the first part of services.

21. The apparatus according to claim 20, wherein the ingress port in the second forwarding entry comprises the first Line ID of the second access device, the egress port in the second forwarding entry comprises an upstream egress port of the second access device, and the second forwarding entry further comprises identifiers of the second part of services.

22. The apparatus according to claim 19, wherein:
when the situation of distribution, which is between the first access device and the second access device, of the services that need to be processed by the virtual AN is that the first access device processes all services in the services that need to be processed by the virtual AN, the first access device is the first device, and the second access device is the second device; and
the first generating unit comprises:
a third determining subunit, configured to: when the ingress port in the virtual AN forwarding entry comprises a first virtual line identifier Line ID, query a correspondence between the first virtual Line ID and a first physical Line ID according to the acquired first virtual Line ID, and determine the first physical Line ID, wherein the first physical Line ID comprises a first Line ID of the first access device and a first Line ID of the second access device; and
a third generating subunit, configured to generate the first forwarding entry, wherein the ingress port in the first forwarding entry comprises the first Line ID of the first access device, the egress port in the first forwarding entry comprises an upstream egress port of the first access device, and the first forwarding entry further comprises identifiers of all the services in the services that need to be processed by the virtual AN; or
the first generating unit comprises:
a fourth determining subunit, configured to: when the ingress port in the virtual AN forwarding entry comprises a first physical line identifier Line ID, and the first physical Line ID comprises a first Line ID of the first access device and a first Line ID of the second access device, determine the first Line ID of the first access device according to the first physical Line ID; and
a fourth generating subunit, configured to generate the first forwarding entry, wherein the ingress port in the first forwarding entry comprises the first Line ID of the first access device, the egress port in the first forwarding entry comprises an upstream egress port of the first access device, and the first forwarding entry further comprises identifiers of all the services in the services that need to be processed by the virtual AN.

23. The apparatus according to claim 22, wherein:
the ingress port in the second forwarding entry comprises the first Line ID of the second access device, and the egress port in the second forwarding entry comprises an upstream egress port of the second access device.

24. The apparatus according to claim 19, wherein: when the situation of distribution, which is between the first access device and the second access device, of the services that need to be processed by the virtual AN is that the second access device processes all services in the services that need to be processed by the virtual AN, the second access device is the first device, and the first access device is the second device; and
the first generating unit comprises:
a fifth determining subunit, configured to: when the ingress port in the virtual AN forwarding entry comprises a first virtual line identifier Line ID, query a correspondence between the first virtual Line ID and a first physical Line ID according to the acquired first virtual Line ID, and determine the first physical Line ID, wherein the first physical Line ID comprises a first Line ID of the first access device and a first Line ID of the second access device; and
a fifth generating subunit, configured to generate the first forwarding entry, wherein the ingress port in the first forwarding entry comprises the first Line ID of the second access device, the egress port in the first forwarding entry comprises an upstream egress port of the second access device, and the first forwarding entry further comprises identifiers of all the services in the services that need to be processed by the virtual AN; or
the first generating unit comprises:
a sixth determining subunit, configured to: when the ingress port in the virtual AN forwarding entry comprises a first physical line identifier Line ID, and the first physical Line ID comprises a first Line ID of the first access device and a first Line ID of the second access device, determine the first Line ID of the second access device according to the first physical Line ID; and
a sixth generating subunit, configured to generate the first forwarding entry, wherein the ingress port in the first forwarding entry comprises the first Line ID of the second access device, the egress port in the first forwarding entry comprises an upstream egress port of the second access device, and the first forwarding entry further comprises identifiers of all the services in the services that need to be processed by the virtual AN.

25. The apparatus according to claim 24, wherein:
the ingress port in the second forwarding entry comprises the first Line ID of the first access device, and the egress port in the second forwarding entry comprises an upstream egress port of the first access device.

26. The apparatus according to claim 19, wherein the services are virtual local area network VLAN services.

27. The apparatus according to claim 18, wherein the first access device is the first device, and the second access device is the second device;
the acquiring unit is specifically configured to:
acquire a virtual AN upstream forwarding entry and a virtual AN downstream forwarding entry that are sent by the access management device, wherein the virtual AN upstream forwarding entry comprises an upstream ingress port, an identifier of an external pseudo wire (PW) of the virtual AN, an upstream label of the external PW of the virtual AN, and an upstream egress port, and the virtual AN downstream forwarding entry comprises a downstream ingress port, the identifier of the external PW of the virtual AN, a downstream label of the external PW of the virtual AN, and a downstream egress port; and
the first generating unit is specifically configured to:
after the access port management apparatus determines that the first access device is a switching provider edge (SPE) device between an internal PW of the virtual AN and the external PW of the virtual AN, generate an upstream PW forwarding entry of the first access device according to the virtual AN upstream forwarding entry, wherein the upstream PW forwarding entry of the first access device comprises an ingress port, an upstream label of the internal PW of the virtual AN, the upstream label of the external PW of the virtual AN, and an egress port, the ingress port in the upstream PW forwarding entry of the first access device comprises a first Line ID of the first access device, the egress port in the upstream PW forwarding entry of the first access device is the upstream egress port in the virtual AN upstream forwarding entry, and the upstream PW forwarding entry of the first access device is a PW switching entry.

28. The apparatus according to claim 27, wherein the second forwarding entry is an upstream PW forwarding entry of the second access device, wherein an ingress port in the upstream PW forwarding entry of the second access device comprises a Line ID of the second access device, an egress port in the upstream PW forwarding entry of the second access device comprises an upstream egress port of the second access device, and the upstream PW forwarding entry of the second access device further comprises the upstream label of the internal PW of the virtual AN.

29. The apparatus according to claim 27, wherein the first generating unit is further specifically configured to:
  after the access port management apparatus determines that the first access device is the switching provider edge (SPE) device between the internal PW of the virtual AN and the external PW of the virtual AN, generate a downstream PW forwarding entry of the first access device according to the virtual AN downstream forwarding entry, wherein the downstream PW forwarding entry of the first access device comprises an ingress port, the downstream label of the external PW of the virtual AN, a downstream label of the internal PW of the virtual AN, and an egress port, and the downstream PW forwarding entry of the first access device is a PW switching entry.

30. The apparatus according to claim 29, wherein the ingress port in the downstream PW forwarding entry of the first access device is the egress port in the upstream PW forwarding entry of the first access device, and the egress port in the downstream PW forwarding entry of the first access device is the ingress port in the upstream PW forwarding entry of the first access device.

31. The apparatus according to claim 27, wherein the apparatus comprises a line identifier Line ID determining unit, wherein:
  the Line ID determining unit is configured to:
  when the ingress port in the virtual AN forwarding entry comprises a first virtual line identifier Line ID, query a correspondence between the first virtual Line ID and a first physical Line ID according to the acquired first virtual Line ID, and determine the first Line ID of the first access device and the Line ID of the second access device, wherein the first physical Line ID comprises the first Line ID of the first access device and the Line ID of the second access device; or
  the Line ID determining unit is configured to:
  when the ingress port in the virtual AN forwarding entry comprises a first physical line identifier Line ID, determine the first Line ID of the first access device and the Line ID of the second access device according to the first physical Line ID, wherein the first physical Line ID comprises the first Line ID of the first access device and the Line ID of the second access device.

32. The apparatus according to claim 20, wherein:
  the virtual Line ID comprises a device identifier of the virtual AN and a first port number of the virtual AN;
  the first Line ID of the first access device comprises a device identifier of the first access device and a first port number of the first access device; and
  the first Line ID of the second access device comprises a device identifier of the second access device and a first port number of the second access device.

33. The apparatus according to claim 18, wherein:
  the first access device is an optical line terminal (OLT), and the second access device is a first optical network unit (ONU), a first optical network terminal (ONT), a first multi-dwelling unit (MDU), or a first digital subscriber line access multiplexer (DSLAM); or
  the first access device is a first digital subscriber line access multiplexer (DSLAM), and the second access device is a second DSLAM; or
  the first access device is a digital subscriber line access multiplexer (DSLAM), management device, and the second access device is a DSLAM.

34. The apparatus according to claim 18, wherein the virtual AN forwarding entry received by the access port management apparatus is sent by the access management device by using a first control protocol or a first management protocol based on layer 3 of an open systems interconnection (OSI) model; and
  when the access port management apparatus needs to send the first forwarding entry or the second forwarding entry to the second access device, the access port management apparatus sends the first forwarding entry or the second forwarding entry by using a second control protocol or a second management protocol based on layer 2 of the open systems interconnection (OSI) model.

* * * * *